United States Patent [19]
Fushimi et al.

[11] Patent Number: 5,475,598
[45] Date of Patent: Dec. 12, 1995

[54] RECOMMENDED ROUTE GUIDE APPARATUS WHICH UTILIZES MULTIPLE START AND END POINTS

[75] Inventors: Makoto Fushimi, Moriguchi; Takeshi Yagyu, Osaka; Yoshiki Ueyama, Sakai, all of Japan

[73] Assignee: Matsushita Electric Industrial Co., Ltd., Osaka, Japan

[21] Appl. No.: 239,689

[22] Filed: May 9, 1994

[30] Foreign Application Priority Data

May 12, 1993 [JP] Japan .................................. 5-110351

[51] Int. Cl.⁶ ............................................. G06F 165/00
[52] U.S. Cl. ........................... 364/444; 340/995; 364/449
[58] Field of Search ................................. 364/444, 449; 340/995, 998; 73/178 R

[56] References Cited

U.S. PATENT DOCUMENTS

| | | | |
|---|---|---|---|
| 4,796,189 | 1/1989 | Nakayama et al. | 364/449 |
| 4,937,753 | 1/1990 | Yamada | 364/449 |
| 5,031,104 | 7/1991 | Ikeda et al. | 364/449 |
| 5,177,685 | 1/1993 | Davis et al. | 364/443 |
| 5,187,667 | 2/1993 | Short | 364/443 |
| 5,204,817 | 4/1993 | Yoshida | 364/449 |
| 5,272,638 | 12/1993 | Martin et al. | 364/444 |

FOREIGN PATENT DOCUMENTS

| | | |
|---|---|---|
| 0346492 | 12/1989 | European Pat. Off. . |
| 3905493 | 8/1990 | Germany . |

OTHER PUBLICATIONS

*Motorola Technical Developments*, vol. 13, Jul. 1991, Schaumburg, Ill., U.S. pp. 58–59, A. M. Kirson "Route Planning System with User Selectable Preferences".

*6th Mediterranean Electrotechnical Conference*; 22–24 May 1991, IEEE US, pp. 888–891, de Diego, et al. "A Decentralized Dynamic Route Guidance System."

*Primary Examiner*—Michael Zanelli
*Attorney, Agent, or Firm*—Beveridge, DeGrandi Weilacher & Young

[57] ABSTRACT

The present invention involves road network recording device for recording positions and connection relation of intersection and roads, location setting device for setting departure point and destination point, search start and end-point setting device for setting a plurality of search start points or search end points, by using a specific range on a map on the basis of the departure point or destination point set by the location setting device, search device for searching a recommended route from the search start point to the search end point set by the search start and end, point setting device from the information in the road network recording device according to a specific rule, and output device for putting out the route obtained by the search device.

11 Claims, 30 Drawing Sheets

Fig. 2 (b)

| | Longitude | Latitude | Adjacent node | | Connection link |
|---|---|---|---|---|---|
| Node N1 | X1 | Y1 | ????? | L1 | |
| Node N2 | X2 | Y2 | ????? | L2 | |
| Node N3 | X3 | Y3 | ----- | L1, L2, L3, L4 | |
| Node N4 | X4 | Y4 | ????? | L3 | |
| Node N5 | X5 | Y5 | ----- | L5 | |
| Node N6 | X6 | Y6 | ????? | L6 | |
| Node N7 | X7 | Y7 | ----- | L4, L6, L7, L8 | |
| Node N8 | X8 | Y8 | ----- | L5, L7, L9 | |
| Node N9 | X9 | Y9 | ????? | L9 | |
| Node N10 | X10 | Y10 | ????? | L8 | |

Fig. 2 (c)

| | Distance | cost | Connection node 1 | Connection node 2 | One-way traffic | Link shape differential data |
|---|---|---|---|---|---|---|
| Link L1 | 60 | 43 (50) | N1 | N3 | go to and from | (X1, Y1), ..., (Xm1, Ym1) |
| Link L2 | 100 | 180 (20) | N2 | N3 | N3→N2 | (X1, Y1), ..., (Xm2, Ym2) |
| Link L3 | 140 | 252 (20) | N3 | N4 | N4→N3 | (X1, Y1), ..., (Xm3, Ym3) |
| Link L4 | 240 | 173 (50) | N3 | N7 | go to and from | (X1, Y1), ..., (Xm4, Ym4) |
| Link L5 | 200 | 720 (10) | N5 | N6 | go to and from | (X1, Y1), ..., (Xm5, Ym5) |
| Link L6 | 100 | 90 (40) | N6 | N7 | go to and from | (X1, Y1), ..., (Xm6, Ym6) |
| Link L7 | 60 | 54 (40) | N7 | N8 | go to and from | (X1, Y1), ..., (Xm7, Ym7) |
| Link L8 | 80 | 58 (50) | N7 | N10 | go to and from | (X1, Y1), ..., (Xm8, Ym8) |
| Link L9 | 100 | 90 (40) | N8 | N9 | go to and from | (X1, Y1), ..., (Xm9, Ym9) |

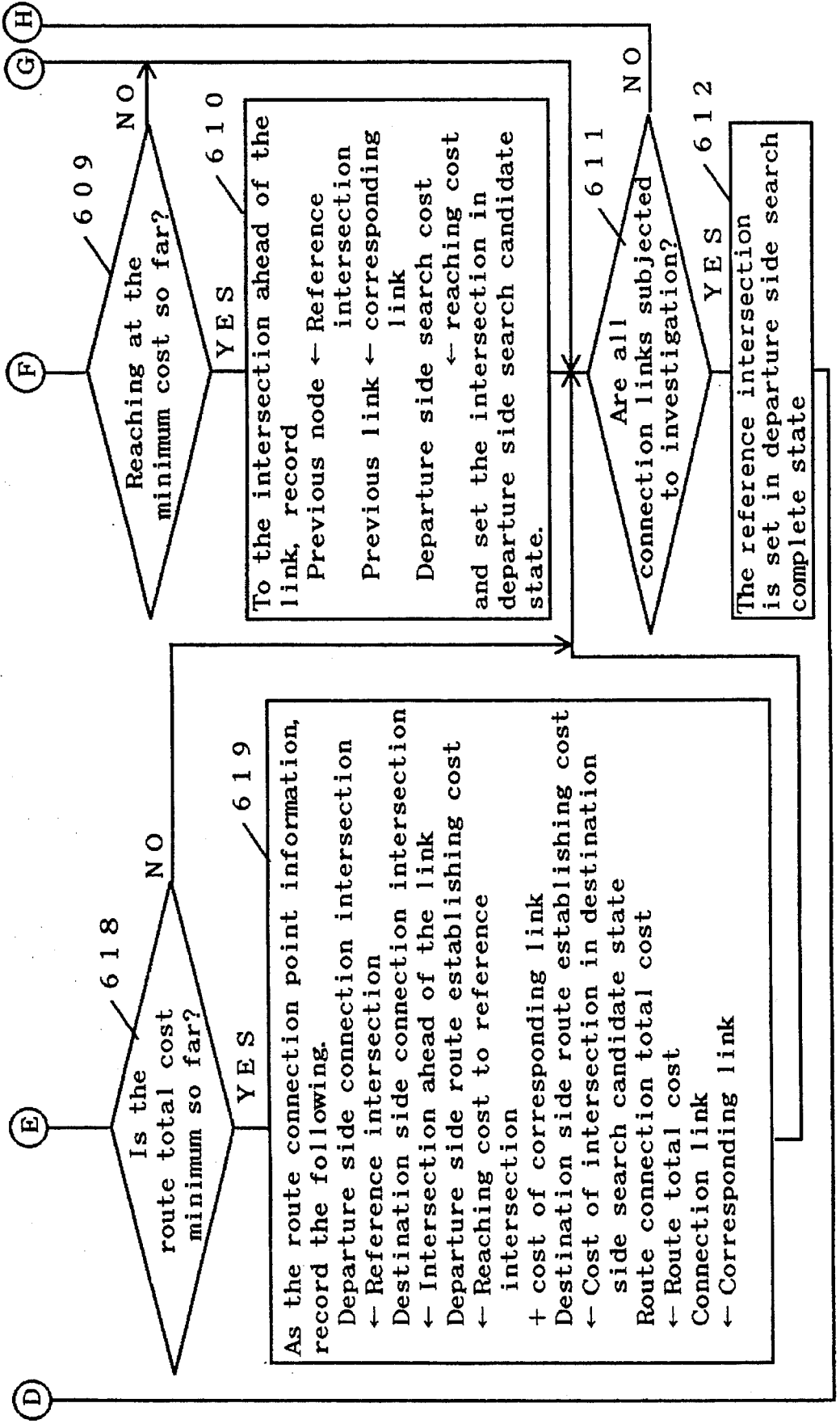

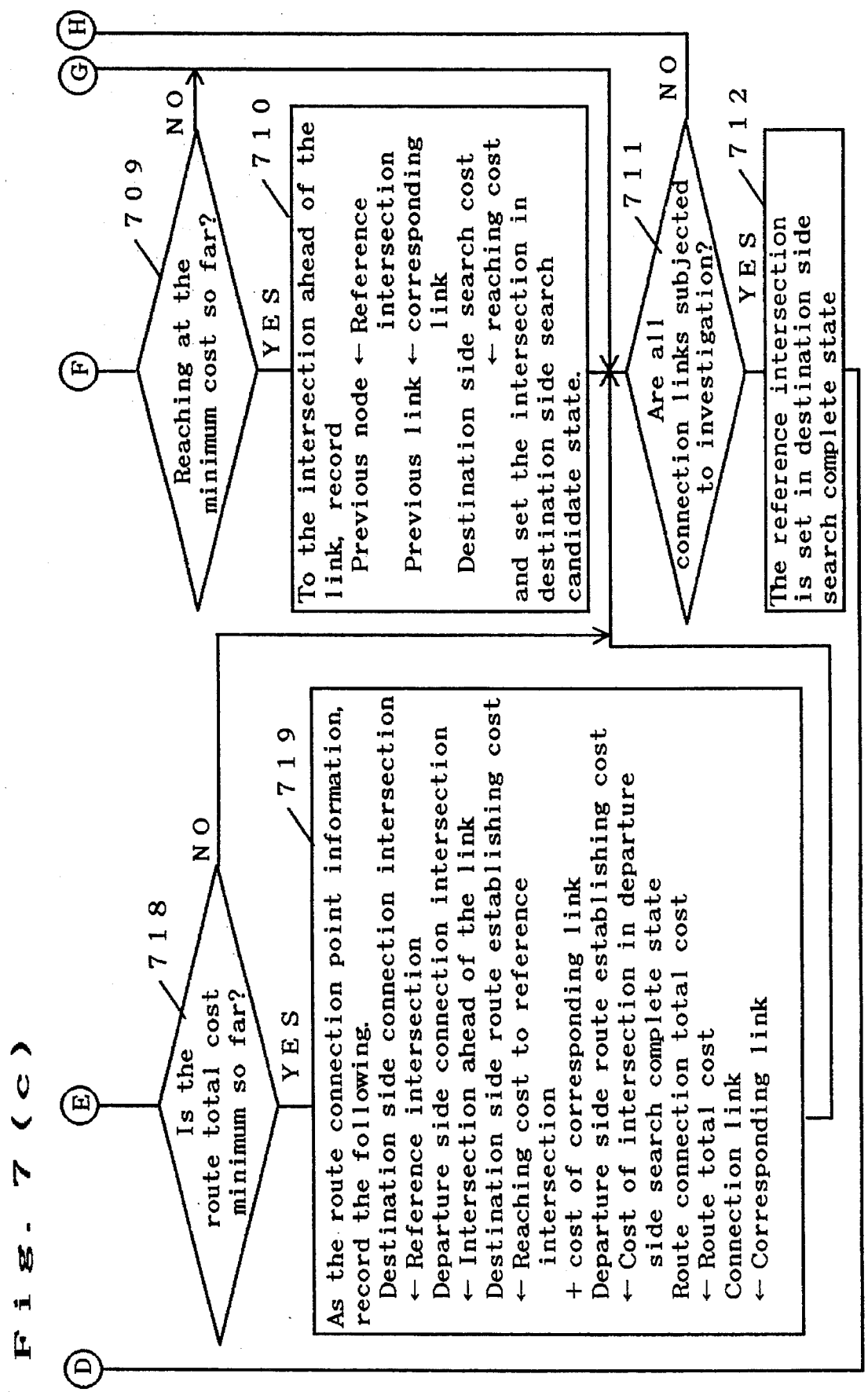

Fig. 8 (b)

| | Longitude | Latitude | Adjacent node | Connection link |
|---|---|---|---|---|
| Node N1 | X1 | Y1 | ????? | L1 |
| Node N2 | X2 | Y2 | ????? | L2 |
| Node N3 | X3 | Y3 | ----- | L1, L2, L3, L4 |
| Node N4 | X4 | Y4 | ????? | L3 |
| Node N5 | X5 | Y5 | ????? | L5 |
| Node N6 | X6 | Y6 | ----- | L4, L5, L6 |
| Node N7 | X7 | Y7 | ----- | L7 |
| Node N8 | X8 | Y8 | ????? | L8 |
| Node N9 | X9 | Y9 | ----- | L6, L8, L9, L10 |
| Node N10 | X10 | Y10 | ----- | L7, L9, L11 |
| Node N11 | X11 | Y11 | ????? | L11 |
| Node N12 | X12 | Y12 | ????? | L10 |

Fig. 8 (c)

| | Distance | cost | Connection node 1 | Connection node 2 | One-way traffic | Link shape differential data |
|---|---|---|---|---|---|---|
| Link L1 | 60 | 43(50) | N1 | N3 | go to and from | (X1, Y1), ..., (Xm1, Ym1) |
| Link L2 | 100 | 180(20) | N2 | N3 | N3→N2 | (X1, Y1), ..., (Xm2, Ym2) |
| Link L3 | 140 | 252(20) | N3 | N4 | N4→N3 | (X1, Y1), ..., (Xm3, Ym3) |
| Link L4 | 200 | 144(50) | N3 | N6 | go to and from | (X1, Y1), ..., (Xm4, Ym4) |
| Link L5 | 100 | 180(20) | N5 | N6 | go to and from | (X1, Y1), ..., (Xm5, Ym5) |
| Link L6 | 40 | 29(50) | N6 | N9 | go to and from | (X1, Y1), ..., (Xm6, Ym6) |
| Link L7 | 200 | 720(10) | N7 | N10 | go to and from | (X1, Y1), ..., (Xm7, Ym7) |
| Link L8 | 100 | 90(40) | N8 | N9 | go to and from | (X1, Y1), ..., (Xm8, Ym8) |
| Link L9 | 60 | 54(40) | N9 | N10 | go to and from | (X1, Y1), ..., (Xm9, Ym9) |
| Link L10 | 80 | 58(50) | N9 | N12 | go to and from | (X1, Y1), ..., (Xm10, Ym10) |
| Link L11 | 100 | 90(40) | N10 | N11 | go to and from | (X1, Y1), ..., (Xm11, Ym11) |

Fig. 11(b)

|  | Longitude | Latitude | Adjacent node | | Connection link |
|---|---|---|---|---|---|
| Node N1 | X1 | Y1 | ????? | L1 | |
| Node N2 | X2 | Y2 | ????? | L2 | |
| Node N3 | X3 | Y3 | ----- | L1, L2, L3, L4 | |
| Node N4 | X4 | Y4 | ????? | L3 | |
| Node N5 | X5 | Y5 | ----- | L4, L5, L6 | |
| Node N6 | X6 | Y6 | ????? | L7 | |
| Node N7 | X7 | Y7 | ----- | L6, L7, L8, L9 | |
| Node N8 | X8 | Y8 | ????? | L8 | |
| Node N9 | X9 | Y9 | ????? | L10 | |
| Node N10 | X10 | Y10 | ----- | L9, L10, L11, L12 | |
| Node N11 | X11 | Y11 | ????? | L11 | |
| Node N12 | X12 | Y12 | ????? | L12 | |
| Node N13 | X13 | Y13 | ????? | L5 | |

Fig. 11(c)

| | Distance | cost | Connection node 1 | Connection node 2 | One-way traffic | Link shape differential data |
|---|---|---|---|---|---|---|
| Link L1 | 60 | 43(50) | N1 | N3 | go to and from | (X1, Y1), ..., (Xm1, Ym1) |
| Link L2 | 100 | 180(20) | N2 | N3 | N3→N2 | (X1, Y1), ..., (Xm2, Ym2) |
| Link L3 | 140 | 252(20) | N3 | N4 | N4→N3 | (X1, Y1), ..., (Xm3, Ym3) |
| Link L4 | 220 | 158(50) | N3 | N5 | go to and from | (X1, Y1), ..., (Xm4, Ym4) |
| Link L5 | 100 | 72(50) | N5 | N13 | go to and from | (X1, Y1), ..., (Xm5, Ym5) |
| Link L6 | 90 | 108(30) | N5 | N7 | go to and from | (X1, Y1), ..., (Xm6, Ym6) |
| Link L7 | 30 | 27(40) | N6 | N7 | N6→N7 | (X1, Y1), ..., (Xm7, Ym7) |
| Link L8 | 210 | 189(40) | N7 | N8 | N7→N8 | (X1, Y1), ..., (Xm8, Ym8) |
| Link L9 | 10 | 12(30) | N7 | N10 | go to and from | (X1, Y1), ..., (Xm9, Ym9) |
| Link L10 | 30 | 27(40) | N9 | N10 | N10→N9 | (X1, Y1), ..., (Xm10, Ym10) |
| Link L11 | 210 | 189(40) | N10 | N11 | N11→N10 | (X1, Y1), ..., (Xm11, Ym11) |
| Link L12 | 70 | 84(30) | N10 | N12 | go to and from | (X1, Y1), ..., (Xm12, Ym12) |

Fig. 13 (b)

| | Longitude | Latitude | Adjacent node | Connection link |
|---|---|---|---|---|
| Node N1 | X1 | Y1 | ????? | L1 |
| Node N2 | X2 | Y2 | ????? | L2 |
| Node N3 | X3 | Y3 | ----- | L1, L2, L3, L4 |
| Node N4 | X4 | Y4 | ????? | L3 |
| Node N5 | X5 | Y5 | ----- | L4, L5, L6 |
| Node N6 | X6 | Y6 | ----- | L6, L7, L8 |
| Node N7 | X7 | Y7 | ????? | L9 |
| Node N8 | X8 | Y8 | ----- | L8, L9, L10, L11 |
| Node N9 | X9 | Y9 | ????? | L10 |
| Node N10 | X10 | Y10 | ????? | L11 |
| Node N11 | X11 | Y11 | ????? | L7 |
| Node N12 | X12 | Y12 | ????? | L5 |

Fig. 13 (c)

| | Distance | cost | Connection node 1 | Connection node 2 | One-way traffic | Link shape differential data |
|---|---|---|---|---|---|---|
| Link L1 | 60 | 43(50) | N1 | N3 | go to and from | (X1, Y1), ..., (Xm1, Ym1) |
| Link L2 | 100 | 180(20) | N2 | N3 | N3→N2 | (X1, Y1), ..., (Xm2, Ym2) |
| Link L3 | 140 | 252(20) | N3 | N4 | N4→N3 | (X1, Y1), ..., (Xm3, Ym3) |
| Link L4 | 180 | 130(50) | N3 | N5 | go to and from | (X1, Y1), ..., (Xm4, Ym4) |
| Link L5 | 180 | 648(10) | N5 | N12 | go to and from | (X1, Y1), ..., (Xm5, Ym5) |
| Link L6 | 40 | 29(50) | N5 | N6 | go to and from | (X1, Y1), ..., (Xm6, Ym6) |
| Link L7 | 100 | 72(50) | N6 | N11 | go to and from | (X1, Y1), ..., (Xm7, Ym7) |
| Link L8 | 100 | 120(30) | N6 | N8 | go to and from | (X1, Y1), ..., (Xm8, Ym8) |
| Link L9 | 30 | 27(40) | N7 | N8 | go to and from | (X1, Y1), ..., (Xm9, Ym9) |
| Link L10 | 210 | 189(40) | N8 | N9 | go to and from | (X1, Y1), ..., (Xm10, Ym10) |
| Link L11 | 70 | 84(30) | N8 | N10 | go to and from | (X1, Y1), ..., (Xm11, Ym11) |

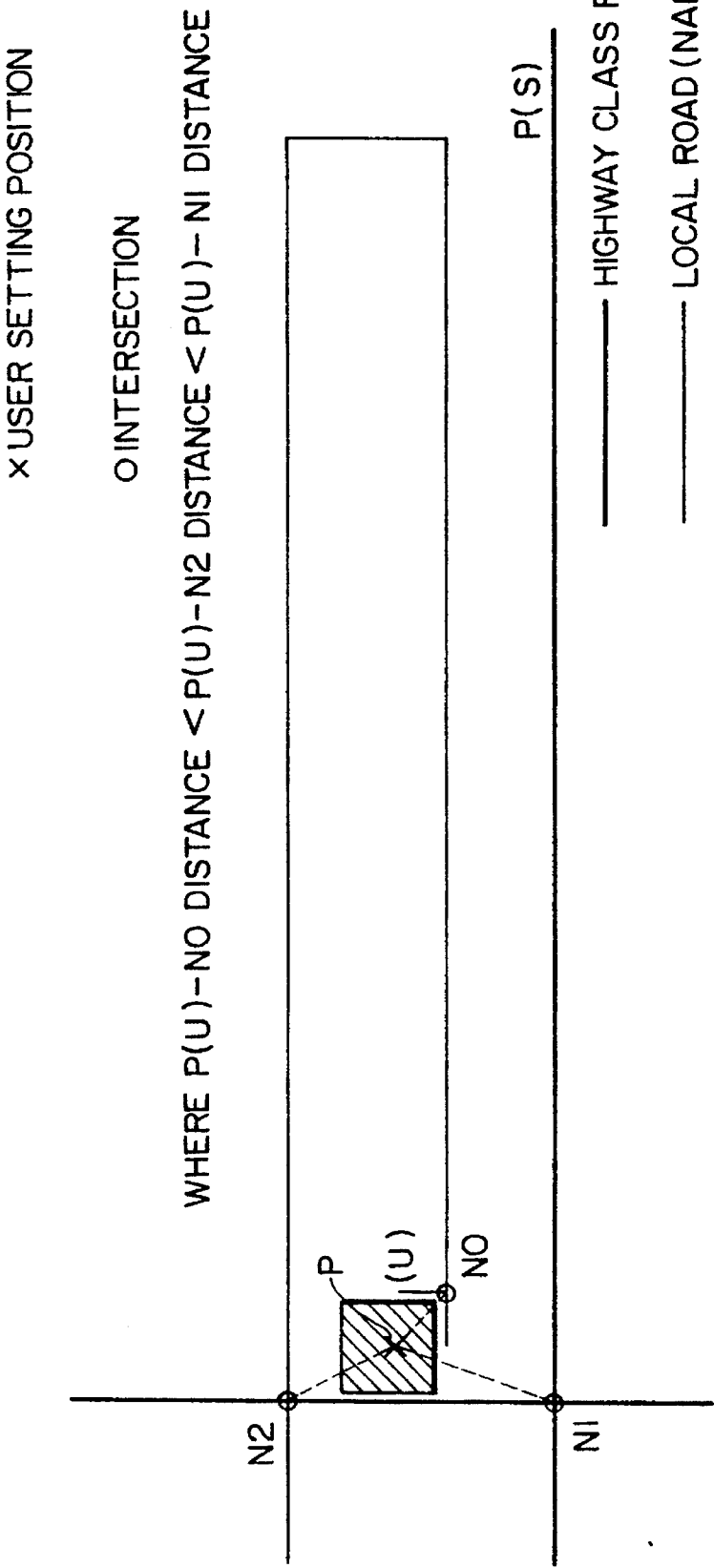

RECOMMENDED ROUTE GUIDE APPARATUS WHICH UTILIZES MULTIPLE START AND END POINTS

DESCRIPTION OF THE INVENTION

1. Field of the Invention

The present invention relates to a recommended route guide apparatus for moving a vehicle from a certain point to another point efficiently, by automatically selecting a route to the point.

2. Related Art of the Invention

In a location setting means in a conventional route search apparatus, for example, a principal intersection closest in distance to the point set by the user is determined as a departure point or a destination point, or the user selects from among plural candidate points as disclosed in the Japanese Patent Publication Hei. 5-6238.

However, if the search start point or search end point is merely set at an intersection closest in distance to the departure point or destination point, there is a possibility that a route may be deduced from a point not intended by the user (or to a point not intended by the user). Such an example is shown in FIG. 15(a) which is a diagram showing an example (destination side) of road network in which a desired route cannot be obtained in a conventional location setting method, and FIG. 15(b) is a diagram showing an example of a selected route determined by the conventional location setting method. In FIG. 15(a), the departure point is in the direction of P(S), and the user desires to go to the point indicated by shaded area and set the location at point P(U). At this time, the distances from point P(U) to intersections N0, N1, N2 are supposed to be in the following relation. P(U)-N0 distance <P(U)-N2 distance <P(U)-N1 distance In these conditions, supposing the search end point to be the intersection closest to the point P(U), the intersection N0 is selected as the search end point, and the route is selected as shown in FIG. 15(b). It means a possibility of selecting a route for passing over the front side of the destination point and guiding to the back side. Besides, aside from setting the location, in the method of letting the user select one intersection from plural candidate intersections, the user may not always be familiar with the geometry of the input location vicinity, and the actual input procedure is complicated. It is hence a first object not to select inadequate route such as passing over, without requiring new input operation.

After satisfying the first object, it is a second object to select an intersection close to the position of location setting.

It is a third object to prevent from setting search start point or search end point at an intersection remote from the road near the position set by the user.

After satisfying the third object, it is a fourth object to select a route for guiding to the most efficient direction to reach the destination point.

SUMMARY OF THE INVENTION

To solve the problems, first means of the invention is the search start and end point setting means for selecting a plurality of intersections as search start point or search end point from the position information of departure point and destination point by the location setting means.

Second means is to add the process of setting an initial cost upon start of search or an additional cost upon reaching the search end point by the function of the distance from the departure point or destination point set by the location setting means to the search start point or search end point set by the search start and end point setting means, to the search start and end point setting means in the first means.

Third means is the search start and end point setting means for selecting one or more roads from the position information of the departure point and destination point set by the location setting means, and selecting an intersection that can be reached according to traffic rule information out of the intersections at both ends of the roads.

Fourth means is to add the process of finding the closest point on each road from the departure point or destination point set by the location setting means, and charging an initial cost upon start of search or an additional cost upon reaching the search end point by the sum of the cost given by the function of the distance to the closest point from the departure point or the destination point and the cost given by the function of the distance from that point to the intersection at both ends of the road, to the Search start and end point setting means in the third means.

According to the first means of the invention, plural intersections in the vicinity are set in the search start point or search end point from the position information of the departure point or destination point entered by the location setting means in the search start and end point setting means, a search start point is created at the destination point direction side near the departure point and a search end point is made in the departure point direction near the destination point, which makes it possible to prevent the selecting of a route which starts from behind the departure point or passing over the destination.

According to the second means, after satisfying the function realized by the first means, by charging an initial cost upon start of search or an additional cost upon reaching the search end point by a function of the distance from the departure point or destination point, a large cost accrues for a very remote search start point or search end point, which makes it possible to prevent selection of a route start point which is or end point far from the position of the departure point or destination point.

According to the third means, one or more roads in the vicinity are selected from the position information of the departure point or destination point entered by the location setting means in the search start and end point setting means, and all intersections that can be reached according to the traffic rule information out of the intersections at both ends thereof are set in the search start point or search end point, which makes it possible to prevent from setting the search start point or search end point at intersections of other roads even if the road closest to the departure point or destination point set by the user is a long link and there is no intersection nearby.

According to the fourth means, after satisfying the function realized by the third means, points on each road closest to the departure point or destination point are determined, and by charging an initial cost upon start of search or an additional cost upon reaching the search end point by the sum of the cost given by the function of the distance to the closest point from the departure point or the destination point and the cost given by the function of the distance from that point to the intersection at both ends of the road, a large cost accrues at inappropriate search start point and search end point for reaching from the departure point to the destination point, which makes it possible to select an appropriate route from the departure point to the destination point.

BRIEF DESCRIPTION OF THE DRAWINGS

FIG. 11(b) is a diagram showing an example of node information data in the road network in the third embodiment of the invention.

FIG. 11(c) is a diagram showing an example of link information data in the road network in the third embodiment of the invention.

FIG. 13(b) is a diagram showing an example of node information data in the road network in the fourth embodiment of the invention.

FIG. 13(c) is a diagram showing an example of link information data in the road network in the fourth embodiment of the invention.

FIG. 15(a) is a diagram showing an example (destination side) of road network where desired route cannot be determined in the conventional location setting method.

DETAILED DESCRIPTION OF PREFERRED EMBODIMENTS

Figure 1:
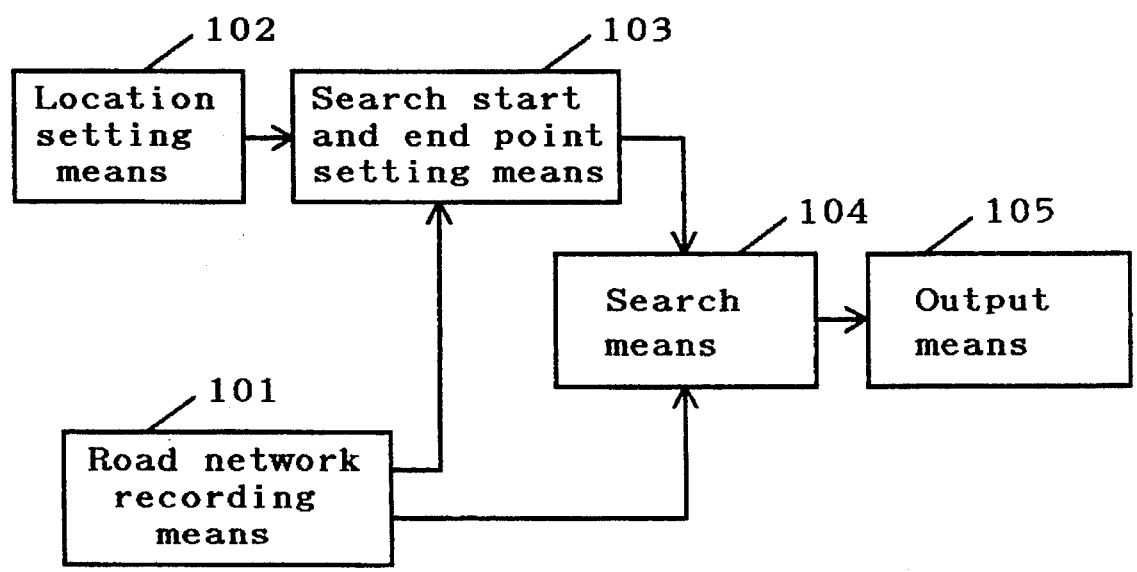
FIG. 1 is a block diagram of a recommended route guide apparatus showing the first to fourth embodiments of the invention.

Referring now to the drawings, embodiments of the invention are described in detail below.

FIG. 1 is a block diagram of a recommended route guide apparatus showing a first embodiment of the invention. In FIG. 1, numeral 101 denotes road network recording means for recording information about road network such as intersections, road connection, coordinates, shapes and attributes, as map data, 102 is location setting means for entering the positions of departure point and destination point, 103 is search start and end point setting means for setting search start point and search end point on the map data from the positions of departure point and destination point entered by the location setting means 102, 104 is search means for selecting a route from the search start point to search end point set by the search start and end point setting means 103 by utilizing the map data stored in the road network recording means 101, and 105 is output means for producing the route determined in the search means 104 by picture or voice.

Figure 2:
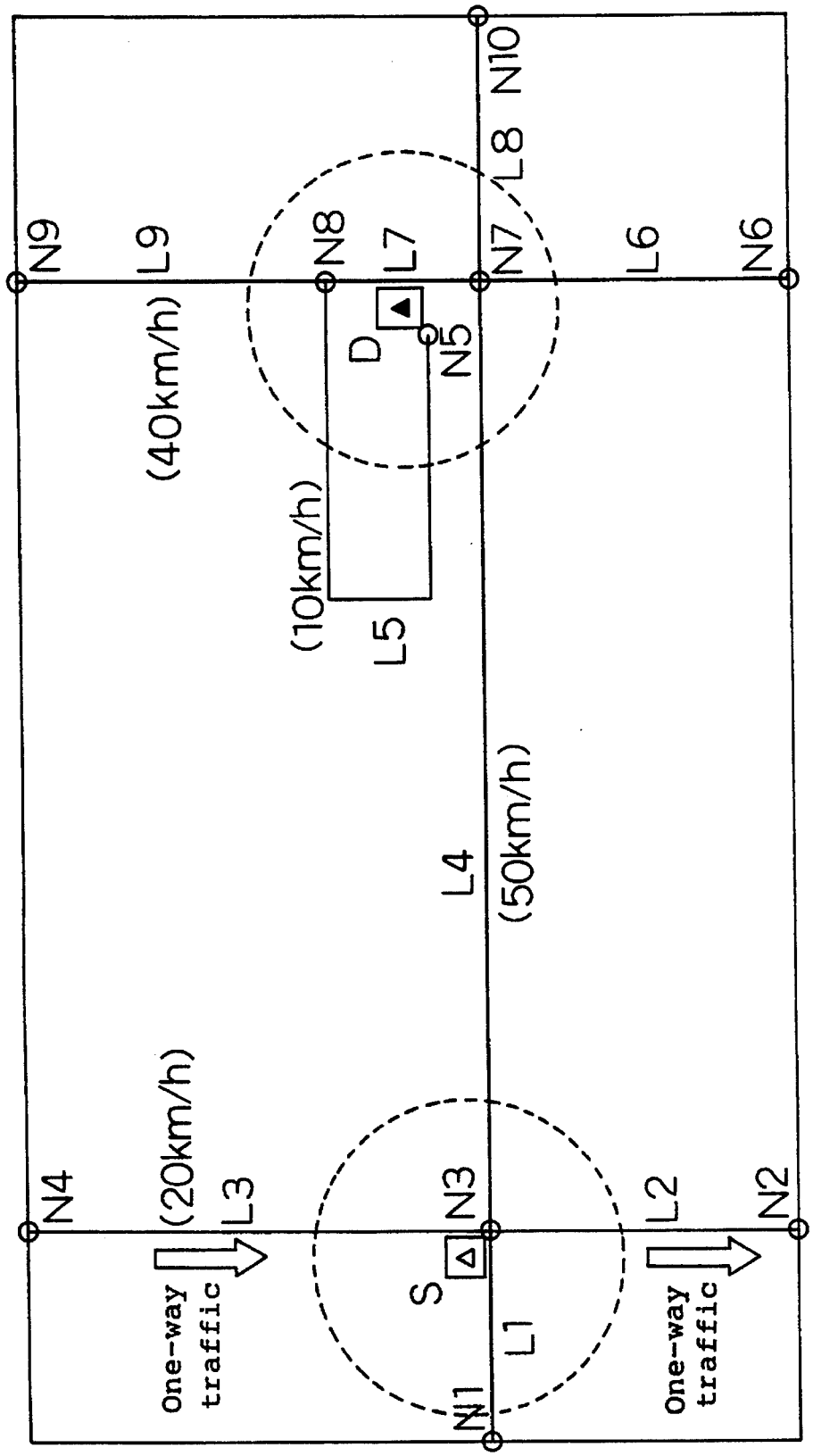
FIG. 2(a) is a diagram showing an example of road network in the first embodiment of the invention.
FIG. 2(b) is a diagram showing an example of node information data in the road network in the first embodiment of the invention.
FIG. 2(c) is a diagram showing an example of link information data in the road network in the first embodiment of the invention.
Figure 3:
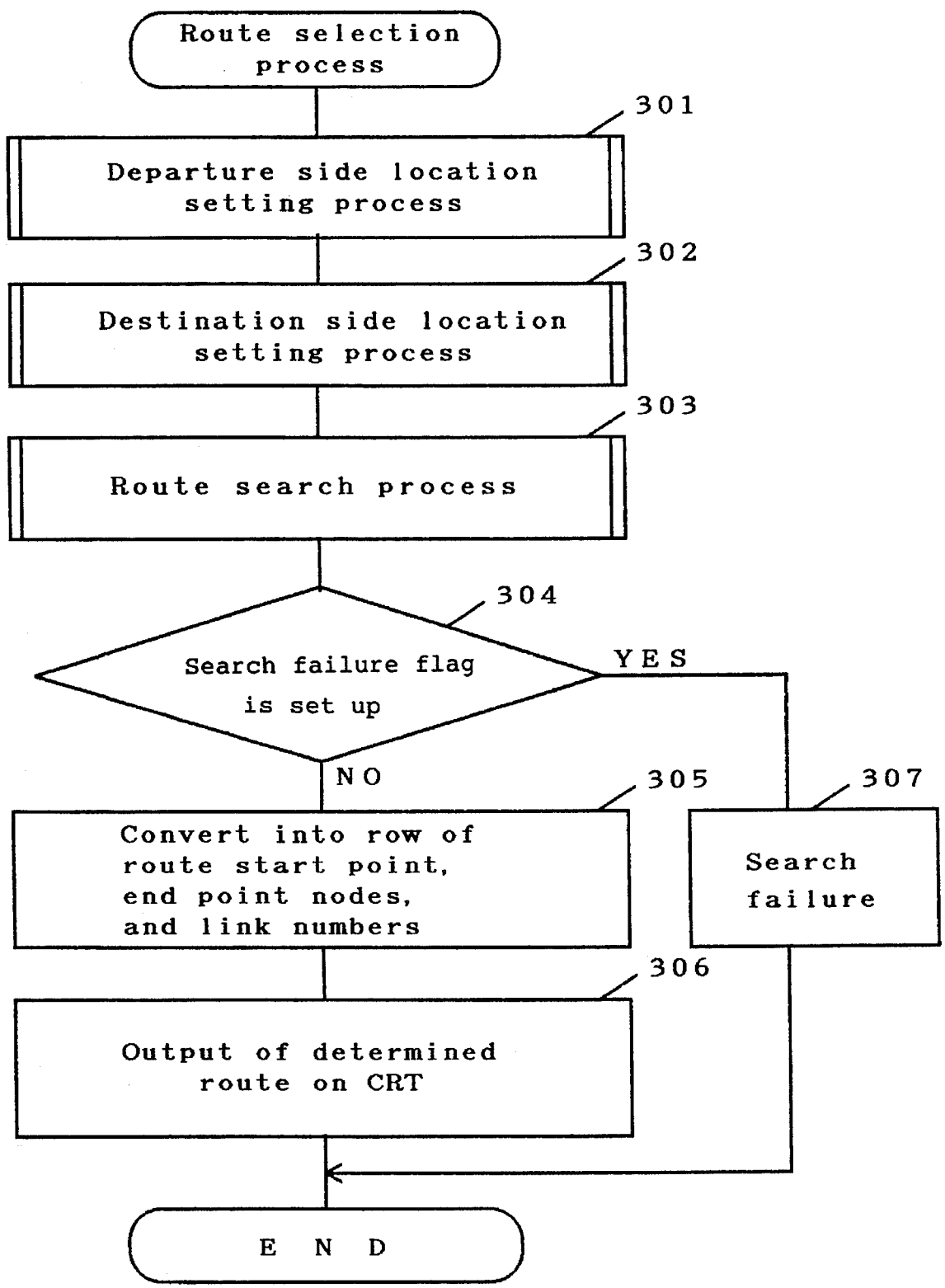
FIG. 3 is a flow chart showing the entire operation of the recommended route guide apparatus in the first to fourth embodiments of the invention.
Figure 4:
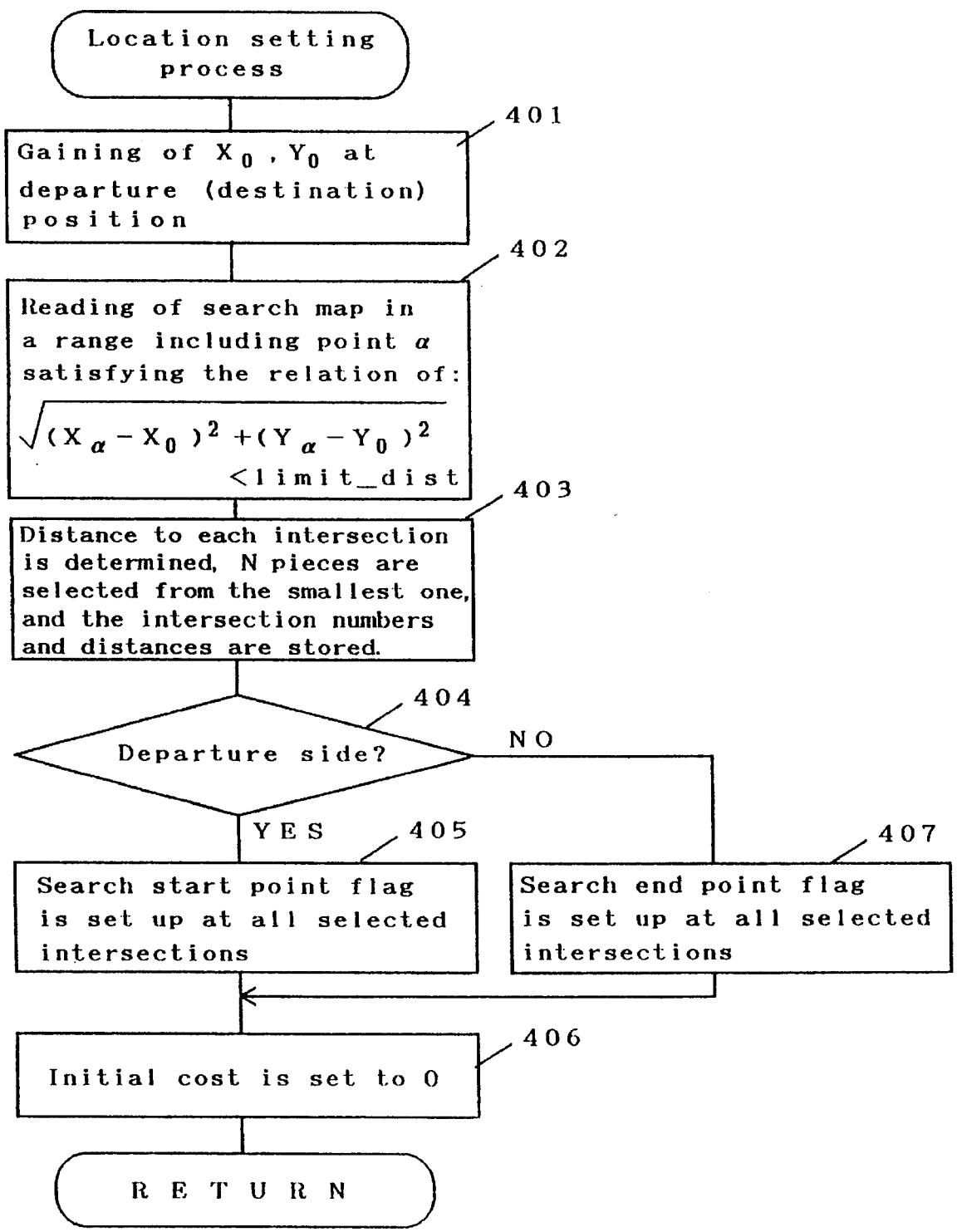
FIG. 4 is a flow chart of location setting process in the first embodiment of the invention.

In the recommended route guide apparatus in the first embodiment, the operation is described below FIG. 2(a) is a diagram showing an example of road network in the first embodiment, FIG. 2(b) is a diagram showing an example of node information in this road network, and FIG. 2(c) is a diagram showing an example of link information in this road network. FIG. 3 is a flow chart showing an entire action of the recommended route guide apparatus in the first embodiment of the invention, and FIG. 4 is a flow chart of location setting process in the first embodiment of the invention.

As shown in FIG. 2(a), in the road network represented by ten nodes N1 to N10 and nine links L1 to L9, the road network recording means 101 stores the node information having at least node position information "longtitude, latitude" and information "connection link" of the link to which the node is connected, as shown in FIG. 2(b), and the link information possessing at least information "connection node 1, connection node 2" of nodes at both ends of the link and shape information "link shape differential data" of the link, as shown in FIG. 2(c). In FIG. 2(a), △ (S) denotes the departure point, ▲ (D) denotes the destination point, ○ denotes a node, and solid line indicates a link (the thickness represents the degree of importance). The speed indication (km/h) means the average travel speed on that road. More specifically, the node information in FIG. 2(b) and the link information in FIG. 2(c) are described herein. First the node information in FIG. 2(b) is explained. The "longitude, latitude" information is the information of the coordinates in which each node is actually located. When one map is divided into two maps, we record one node on each map at the crossing point of the road on boundary of two maps, and record "adjacent node" information which denotes the relation of the two nodes. The "adjacent node" information is the information of the node in the adjacent map being actually the same node. However, in the case of the road network in FIG. 2(a), one map is used for the sake of simplicity, and the information of "adjacent node" is not used. The "connection link" information is the information showing to which link the node is connected. Next, the link information in FIG. 2(c) is explained. As the "distance" information, the distance on the actual road is recorded, and it is shown in units of, for example, meters. This information can be calculated from the link shape data described below, but it is preferred to have this information as data considering the time required for calculation. The "cost" information varies with the criterion when selecting the route. Herein, for example, to determine the route of the minimum travel time, suppose the travel time in the link is possessed in the unit of 0.1 sec. In this case, (km/h) indicates the average travel speed (per hour) in the link. Although the cost can be calculated from the distance and speed, it is preferred to record preliminarily considering the time required for calculation. "Connection node 1, connection node 2" indicates to which nodes both ends of the link are connected. The "one-way" information indicates the one-way traffic regulation where designated. In the diagram, "N3→N2" means the traffic is permitted only in the direction from node N3 to node N2. The "link shape differential data" shows how the link is shaped from "connection node 1" to "connection node 2", by recording the differential data from the position of "connection node 1". It is supposed herein that the user wishes to know the route to reach from departure point Δ to destination point ▲ in FIG. 2(a). The processing at this time is described in detail below according to the flow chart in FIG. 3 and FIG. 4.

First, at step 301 in FIG. 3, the user sets the point at the departure side. This processing is described in detail in FIG. 4. At step 401 in FIG. 4, the user determines the position of the departure point by moving, for example, a cursor, which may be displayed, for example, on a map appearing on a CRT, and converts into a desired system of coordinates to obtain the position information. At step 402, around the set coordinates of the departure point, map information is read to determine nodes in a range of a circle with a radius of limit_dist (dotted circle in FIG. 2(a) for example, a range of 50 m). If the region in this circle expands over plural maps, plural maps must be read in, but in the shown case it is enough to read only one map for the sake of simplicity. At step 403, the distance to each node (N1 to N12) is sequentially calculated from the longitude and latitude information in FIG. 2(b) and the position information of the departure point obtained at step 401, and selected and recorded by N pieces (for example, four) sequentially from the shortest distance. In the case of FIG. 2(a), only node N3 is present in the range of the circle, and the node N3 and its distance DN3 are stored. Next, at step 404, it is judged whether the departure side or not, and if departure side, advancing to step 405, a search start point flag is set up at node N3. Furthermore, at step 406, for each node selected above, the initial cost upon start of search is set at a specific value (for example, 0). This ends the processing at step 301.

Next, at step 302, the location at the destination side is set in the same processing as at step 301. What is different from the departure side is as follows: when it is judged to be the destination side at step 404, advancing to step 407, a search end point flag is set up at the selected node. By the processing at step 302, in the example shown in FIG. 2(a), three nodes N5, N7, N8 are selected as search end point. The initial cost is handled similarly.

Figure 5:
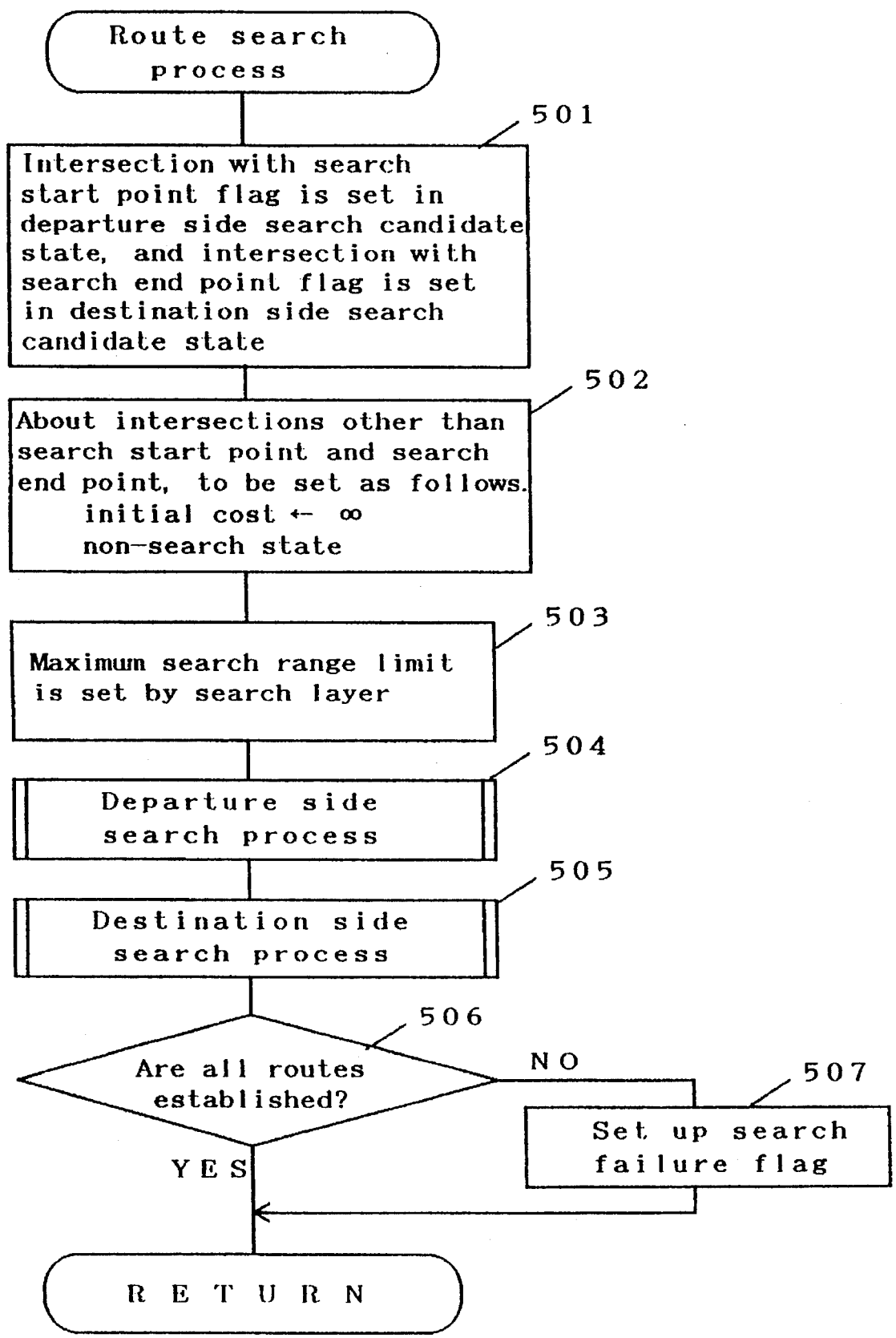
FIG. 5 is a flow chart of route search process in the first to fourth embodiments of the invention.
Figure 6A:
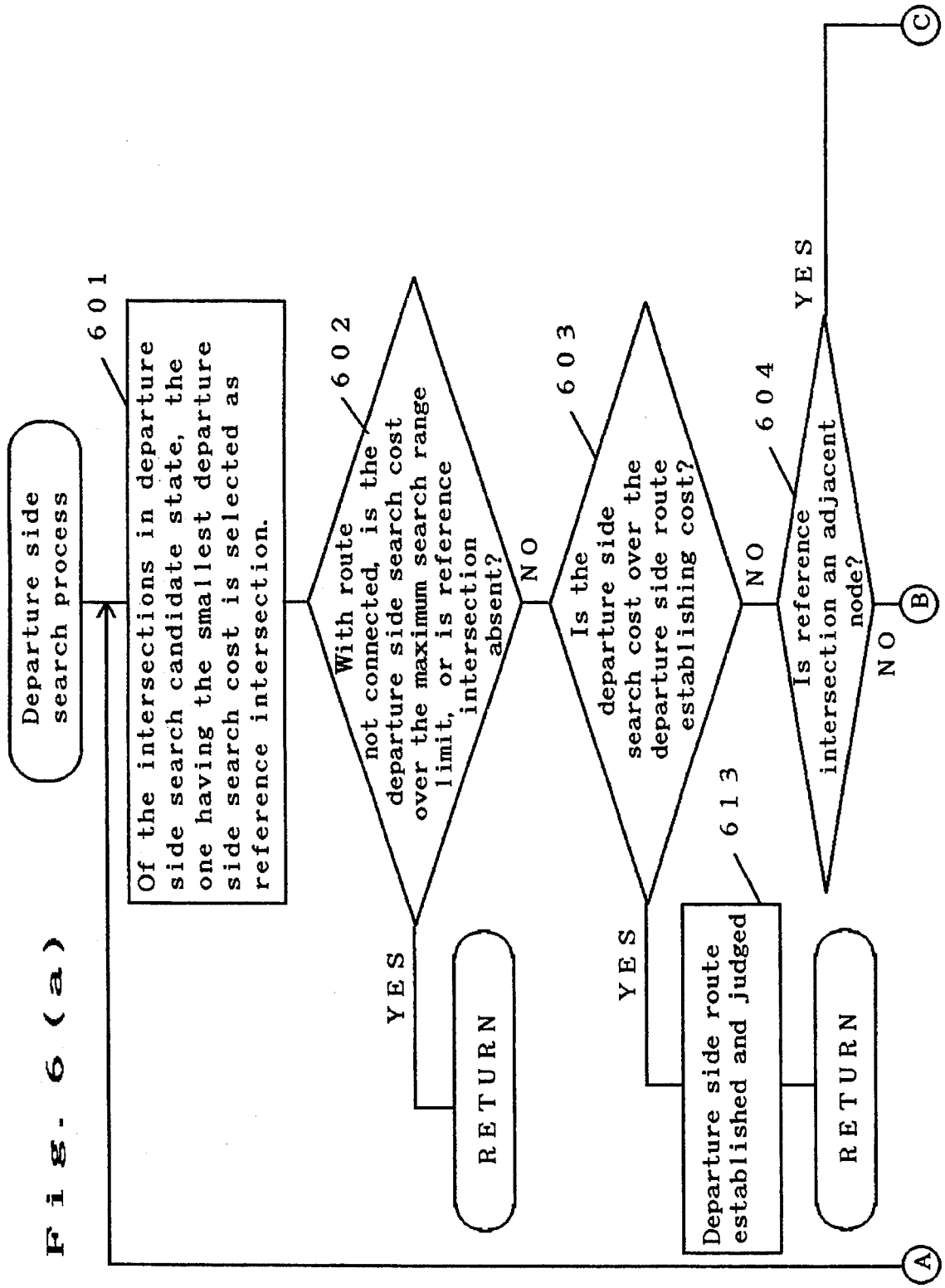
FIG. 6(a), (b), (c) are a flow chart of departure side search process in the first to fourth embodiments of the invention.
Figure 6B:
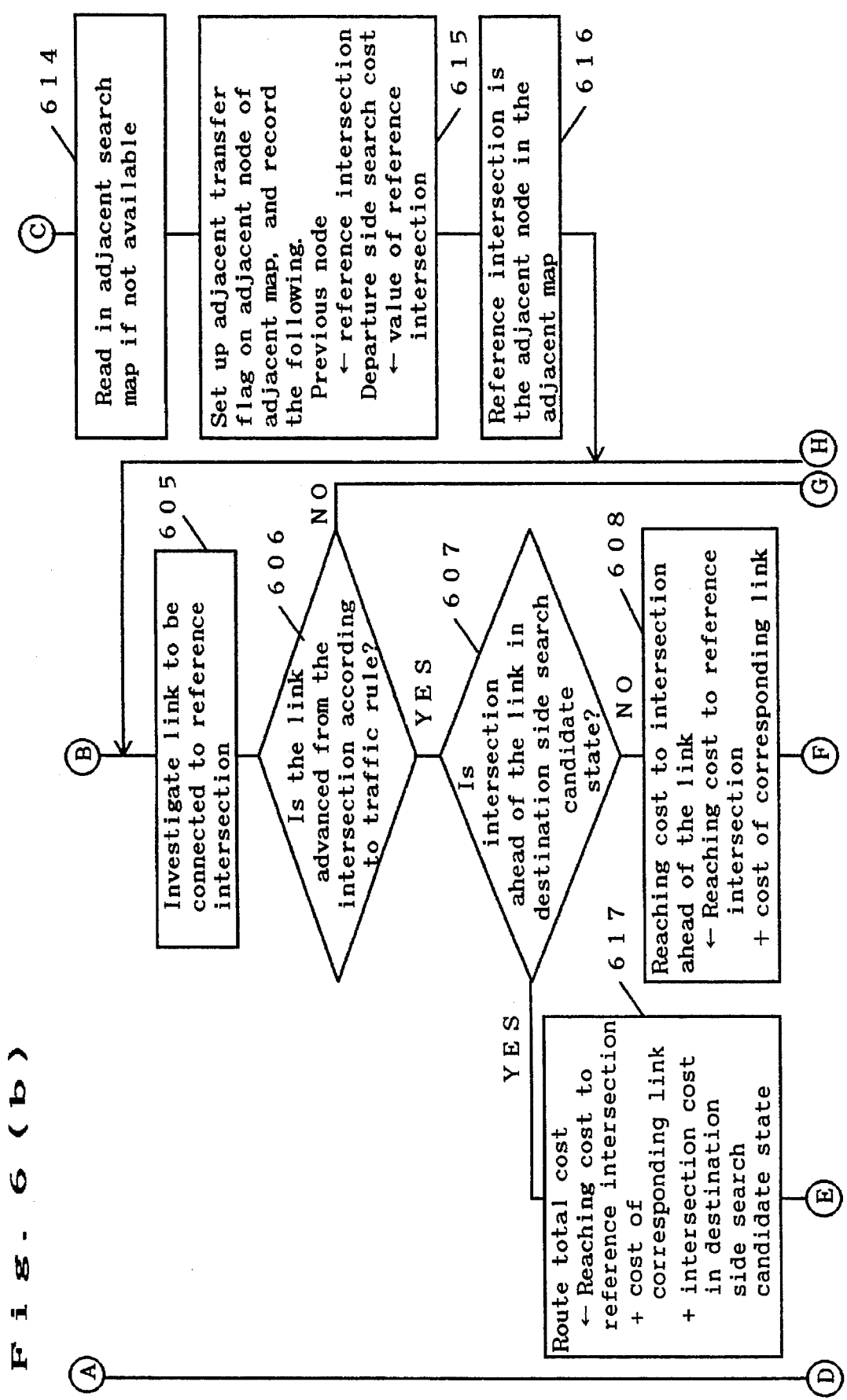

At step 303, the route search process is executed. FIG. 5 shows a flow chart of route search process in the first embodiment of the invention, FIG. 6(a), (b), (c) show a flow chart of search process at departure side in the first embodiment of the invention, and FIG. 7(a), (b), (c) show a flow chart of search process at destination side in the first embodiment of the invention. A further detail is described below while referring to these charts. At step 501, the node N3 having the search start point flag is set in departure side search candidate state, and the nodes N5, N7, N8 having the search end point flag are set in destination side search candidate state. Next, at step 502, other nodes than the nodes in departure side and destination side search candidate state are initialized to be set in non-search state and to make the initial cost infinite. Further, at step 503, the maximum search range limit is set by the value of search cost. This maximum search range limit should be sufficiently larger than the search range (for example, 10 hours). Search is stopped if exceeding this limit. At step 504, the departure side search process is executed. The detail of this process is shown in FIG. 6(a), (b), (c), and it is described according to the flow chart.

First, at step 601, the node of the smallest departure side search cost among the nodes in departure side search candidate state is determined as the reference intersection. Herein, the node in departure side search candidate state is only node N3, and hence node N3 is the reference intersection. If the cost is same in the case of a plurality, it is same as the explanation of the destination side search candidate, and hence it is omitted. At step 602, it is judged whether or not to transfer to search of destination side. Herein, the reference intersection is present, and the maximum search range limit is supposed to be sufficiently large, and therefore the operation advances to step 603. At step 603, it is judged whether the route is established or not by judging if the departure side search cost has exceeded the departure side route establishing cost (initial value: infinite). Finally, the route is determined by destination side search process. Herein, the departure side route establishing cost remains infinite (initial value), the operation proceeds to the process at step 604. At step 604, it is judged whether the reference intersection is node (adjacent node) connected to the adjacent map or not, and if so, processes at steps 614, 615, 616 are done, and the reference intersection is transferred to the adjacent node of the adjacent map, but in the road network in FIG. 2(a), only one map is used for the sake of simplicity, and therefore the adjacent node is not taken in consideration. At step 605, links connecting to the reference intersection are sequentially set as investigation target links. According to node information of FIG. 2(b), the links which connected to node N3 are four links L1, L2, L3, L4. First, the link L1 is selected as investigation target link. It is checked at step 606 whether or not it is possible to advance from node N3 to node N1 by using link L1. If not able to advance from node N3 to node N1 due to one-way traffic limitation, the operation skips to step 611. However, considering from the link information in FIG. 2(c), since the link L1 is a two-way link, the operation advances to step 607. At step 607, it is judged whether another node of the investigation target link is in destination side search candidate state or not. If the other node of the investigation target link is in destination side search candidate state, advance to step 617 where it is judged whether or not to record the route, assuming that the departure side and destination side are connected. At the present, the other node N1 of investigation target link is in non-search state, and therefore the operation goes to step 608. At step 608, the cost for reaching the node N1 is calculated. The node N3 is departure point and the initial cost is 0, and seeing from that:

reaching cost to node N1 ⇐ reaching cost to reference intersection [initial cost: 0]
+ cost of investigation target link L1 [43]

the reaching cost to node N1 is "43". Next, at step 609, it is judged whether or not reaching the node N3 so far at minimum cost. If once reaching at the smallest cost, moving to step 611, the result of the present search is not stored in the node N1. However, since the node N3 is in initial state, this is the first time to reach. Accordingly, moving to step 610, the search result is stored in the node N1. The data to be stored include the following.

previous node←node N3
 previous link←link L1
 departure side search cost←43

Furthermore, the node N1 is set in departure side search candidate state. Next, at step 611, it is judged if all links connected to the node N3 have been selected as investigation target links. In this case, links L2, L3 and L4 are remaining, and the process returns to step 605. At step 605, the link L2 is selected as investigation target link. At step 606, it is checked if possible to advance from node N3 to node N2 on the link L2, and it is known from the link information in FIG. 2(c) that the traffic is limited in one-way in the advancing direction, and therefore the processing advances to step 607. The process from step 607 to step 611 is repeated same as above, and the next search result is stored in the node N2.

previous node←node N3
 previous link←link L2
 departure side search cost←"180"

Further the node N2 is set in departure side search candidate state. At step 611, as the links to be connected to the node N3, links L3 and L4 are remaining, and returning, to step 605, the investigation target link is set at L3. At step 606, however, not able to advance from node N3 to node N4 on the link L3 due to one-way traffic regulation, and the processing advances to step 611. Hence, the search result is not stored in the node N4. At step 611, link L4 is left over as the link to be connected to the node N3, returning to step 605, the investigation target link is set at L4. Up to step 606, the operation is same as in the prior art, but at step 607, since the another node N7 of the investigation target link is in destination side search candidate state, the operation goes to step 617 in order to select and judge the route. Herein, the total cost of route is calculated.

route total cost ← reaching cost to reference intersection
        N3 [initial cost: 0]
      + cost of investigation target link [173]
      + cost of intersection N7 in destination
       side search candidate state
       [initial cost: 0]

Accordingly, the route total cost is calculated to be "173". Next, at step 618, it is judged whether the calculated route total cost was the minimum cost of the routes determined. If not the minimum cost, estimating that a route was once determined to reach from the departure point to the destination point at a smaller cost, the operation goes to step 611, and the present search result is not stored. In this case, however, since the departure side and destination side were connected for the first time, the operation skips to step 619, and the following information is stored as the route connection point information.

departure side connection intersection ← node N3
 destination side connection intersection ← node N7
 departure side route establishing cost ← "173"
 destination side route establishing cost ← "0"
 route connection total cost ← "173"

-continued
 connection link      ← link L4

Then moving to step 611, it is judged whether all links connected to the reference intersection N3 are set as investigation target links. Herein, since all links have been investigated, the operation goes to step 612. At step 612, the reference intersection N3 is set in the departure side search complete state, the search processing by reference to node N3 is terminated. Back to step 601, all nodes are investigated, the node of the minimum departure side search cost in departure side search candidate state is searched. At the present, two nodes N1, N2 connected to the node N3 respectively possess departure side search costs "43", "180", and are in departure side search candidate state. It is node N1 that the departure side search candidate node having the smallest departure side search cost at the present moment. Accordingly, the node N1 is selected as the reference intersection. The subsequent processing at steps 602 to 608 is same as above (adjacent node is not considered, assuming only one map to be searched for the sake of simplicity), the link L1 becomes the investigation target link, and "43+43" is determined as the reaching cost to the node N3, but since the initial cost "0" is given as the search start point in node N3 at step 610, it is judged that it was not reached by the hitherto minimum cost, and the operation advances to step 611. At step 611, all connection links connected to the node N1 are confirmed to be investigated, and, going to step 612, the node N1 is set in departure side search complete state. Returning to step 601, similarly, the next reference intersection is set at node N2. At step 603, since the departure side search cost "180" of node N2 is greater than "173" of the departure side route establishing cost, advancing to step 613, a flag is set up to indicate the contact at the destination side in the departure side route search process. This ends the departure side search process at step 504.

Figure 7A:
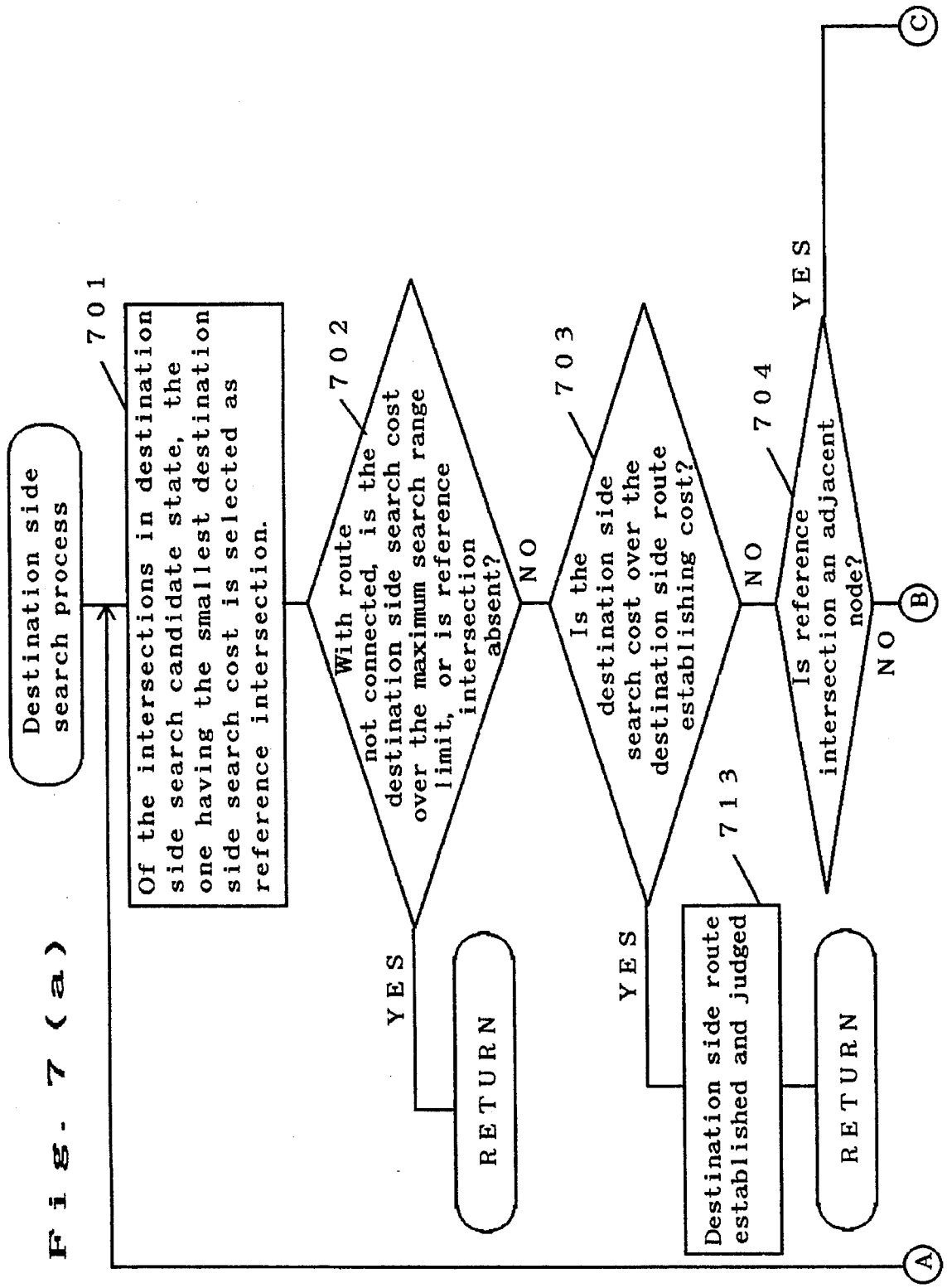
FIG. 7(a), (b), (c) are a flow chart of destination side search process in the first to fourth embodiments the invention.
Figure 7B:
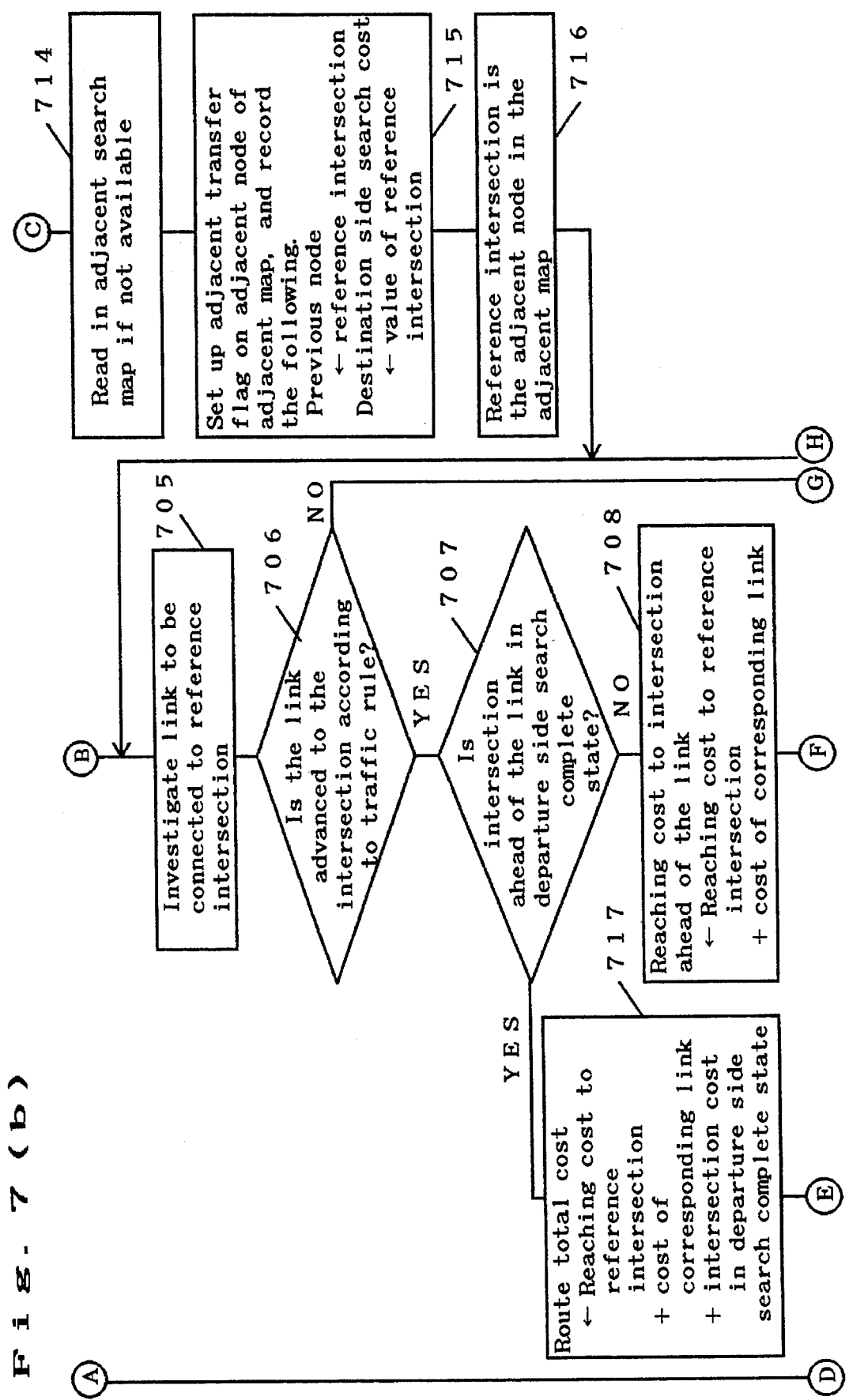

Advancing next to step 505, the destination side search process is executed. The detail of this process is shown in FIG. 7(a), (b), (c). Basically, this is different from the departure side search process in two points. One point is that the one-way traffic regulation is considered reversely when checking at step 706 to see if the investigation target link connected to the reference intersection can run or not because search is extended in reverse direction of actual travel of vehicle in the case of destination side search. The other point is that the contact state of the destination side search range and departure side search range is judged at step 707 in the departure side search complete state of the another node of the investigation target link. In other points, the search process is same as at the departure side. In this case, the nodes N6, N9, N10 are in destination side search candidate state respectively possessing destination side search costs "90", "90", "58", and when the node N10 is selected as the next reference intersection, the destination side route establishing cost is "0" and the destination side search cost is "58", and hence the judgement at step 703 is followed by the process at step 713. Herein, a flag is set up to acknowledge the firm judgement of destination side route and establishment of entire route. This ends the destination side search process at step 505.

It is confirmed at step 506 that the route has been established, and if the route is not established, a search failure flag is set up at step 507. In this case, however, since the flag for establishment of entire route has been set up at step 713, it is judged that the entire route has been established at step 506, thereby terminating the route search process at step 303.

At step 304, it is checked whether search failure flag has been set up or not. When the search is judged to be successful, the operation advances to step 305, and the route is composed by, for example, reshuffling the determined route in the traveling sequence in the row of map number and link number (including directivity). Furthermore, by displaying the route determined at step 306 in matching with the map shown on the CRT, the route is shown to the user. At step 304, when search failure flag is setup, search failure is judged, and search failure remedy is effected by, for example, telling the user that the route has not been determined at Step 307. In this case, when the route is composed of the route point connection information, the route of reaching from node N3 to node N7 through link L4 is obtained. Hence, the following route composing result is left over.

```
map number 1 <--- * (not required because only one
                        map is used)
link number 1 <--- link L4
directivity   <--- from "connection node 1" to
                   "connection node 2"
```

In this way, according to the first embodiment, by selecting plural points as departure point or destination point, for example, in the road network in FIG. 2(a), it prevents from creating the route passing over before the destination point in the sequence of node N3, link L4, node N7, link L7, node N8, link L5, and node N5.

A second embodiment of the invention is described below. A block diagram of recommended route guide apparatus in the second embodiment of the invention is same as in the first embodiment.

In the recommended route guide apparatus in the second embodiment, the operation is described below. FIG. 8(a) is a diagram showing an example of road network in the second embodiment, FIG. 8(b) is a diagram showing an example of node information in the road network, and FIG. 8(c) is a diagram showing an example of link information in the road network. FIG. 9 is a flow chart of location setting process in the second embodiment of the invention.

Figure 8:
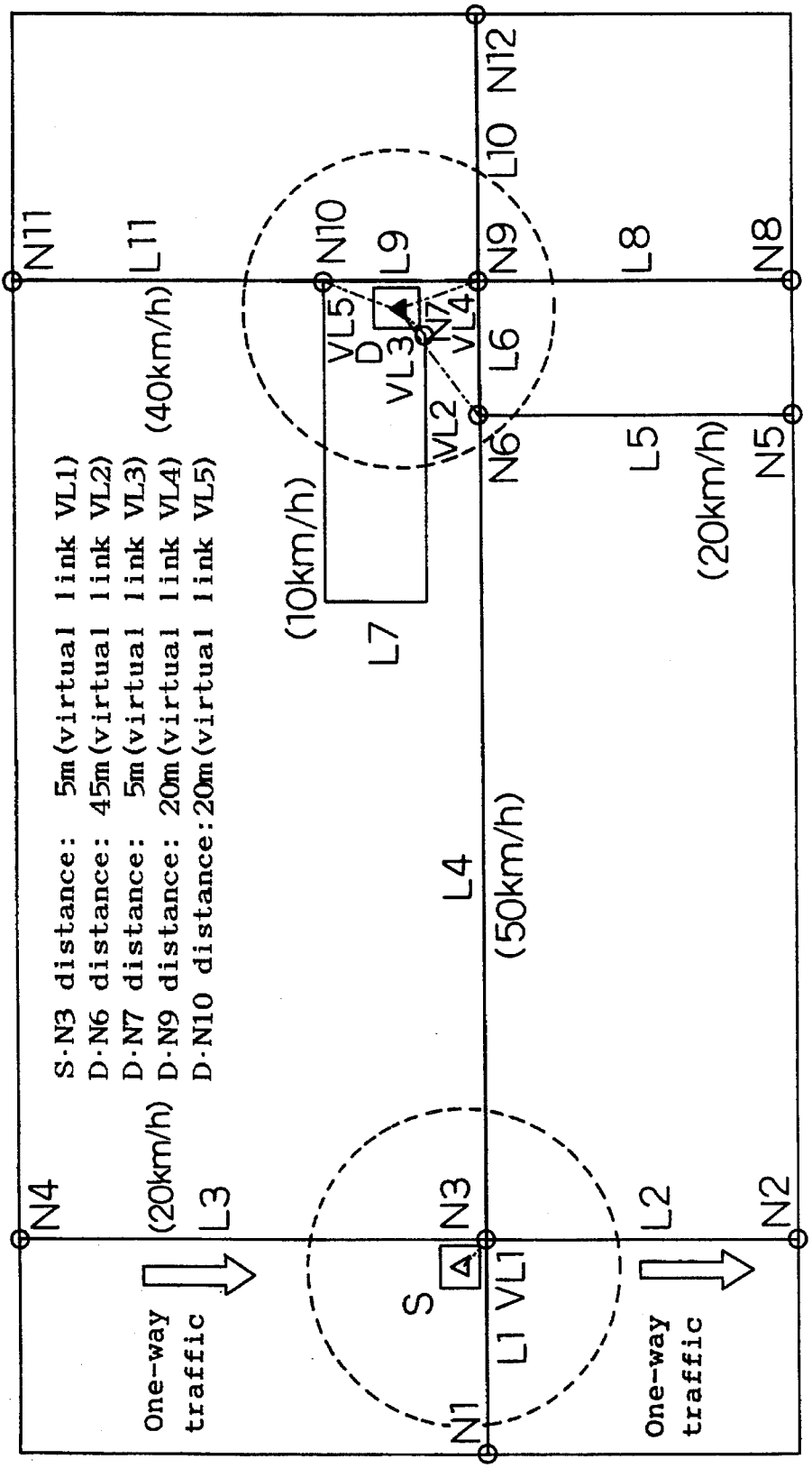
FIG. 8(a) is a diagram showing an example of road network in the second embodiment of the invention.
FIG. 8(b) is a diagram showing an example of node information data in the road network in the second embodiment of the invention.
FIG. 8(c) is a diagram showing an example of link information data in the road network in the second embodiment of the invention.
Figure 9:
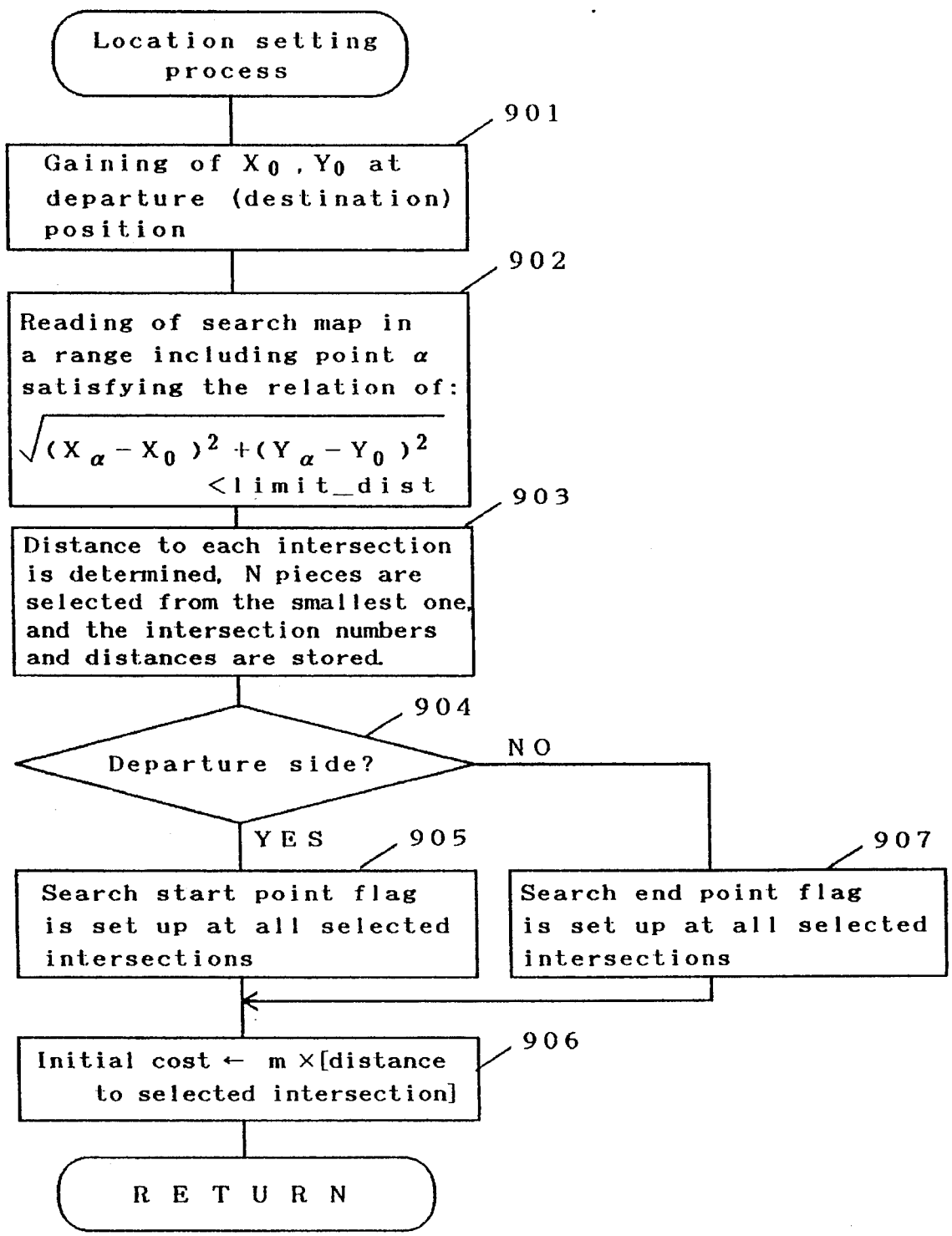
FIG. 9 is a flow chart of location setting process in the second embodiment of the invention.

Now, referring to the road network in FIG. 8 and flow chart of location setting process in FIG. 9, the difference from the first embodiment is discussed. First, as shown in FIG. 8(a), in the road network represented by twelve nodes N1 to N12 and eleven links L1 to L11, the node information as shown in FIG. (8b) and the link information shown in FIG. 8(c) are stored in the road network recording means 101. Reference numerals are same as in FIG. 2.

In the case of this network, when the route is determined same as in the first embodiment, supposing the number of intersections N selected at step 403 in FIG. 4 to be 4, since the node N6 in FIG. 8 is included in one of the search end points, the route to be selected finally is the route of node N3, link L4 and node N6 having the smallest cost of the combinations of linking the search start point group (node N3) and search end point group (nodes N6, N7, N9, N10). Hence, only the route up to node N6 can be determined, and the route is known only up to considerably before reaching the destination point ▲. Accordingly, in the second embodiment, this problem is solved by varying the location setting process as shown in FIG. 9.

The difference between the location setting process in the second embodiment and the location setting process in the first embodiment lies in the setting of initial cost at step 906. In the first embodiment, the same value (0) was used uniformly at shown in step 406, but in the second embodiment, a value proportional to the distance is given as shown in step 906. The proportional coefficient m at step 906 is a positive real number. More specifically, assuming a virtual link VL1 between the departure point S and node N3, and virtual links VL2, VL3, VL4, VL5 between the destination point D and nodes N6, N7, N9, N10, each virtual link is assigned with a virtual link cost corresponding to the initial cost, and the same result as when the minimum cost route is determined on the road network including the virtual link from the departure point S to the destination point D is obtained without adding process to the map data.

For example, among the links in FIG. 8(a), the smallest average traveling speed is 10 km/h, but a value equal to travel of a linear distance at speed of 5 km/h is given as initial cost. Hence, the next initial cost is given to the node N3.

$$5(m)/5(km/h) \times 36 = 36(10^{-1}sec)$$

Likewise, each search start point and search end point both possess the initial cost as shown in Table 1.

[TABLE 1.]

| Example of initial cost at search start point and search end point in second embodiment | | |
|---|---|---|
| Classification | Node number | Initial cost |
| Search start point | Node N3 | 36 |
| Search end point | Node N6 | 324 |
| | Node N7 | 36 |
| | Node N9 | 144 |
| | Node N10 | 144 |

There are four combinations of search start point and search end point. At this initial cost, total costs of these routes are compared in all combinations of routes in Table 2.

[TABLE 2.]

| Total cost of routes in combinations of routes in the second embodiment | | | |
|---|---|---|---|
| Search start point | Search end point | Relay link | Route total cost |
| Node N3 | Node N6 | L4 | 53 (36 + 144 + 324) |
| | Node N7 | L4-L6-L9-L7 | 1019 (36 + 144 + 29 + 54 + 720 + 36) |
| | Node N9 | L4-L6 | 353 (36 + 144 + 294 + 144) |
| | Node N10 | L4-L6-L9 | 407 (36 + 144 + 29 + 54 + 144) |

In this case, the minimum cost route is a channel from node N3 to node N9, and the total cost is 353.

In this way, by processing route search same as in the first embodiment by employing the location setting technique which is a feature of the second embodiment, the minimum cost route of node N3, link L4, link L6 and node N9 connecting the search start point and search end point can be determined. Accordingly, as in the case of the location setting technique in the first embodiment, the phenomenon of obtaining the route only to considerably before the destination point is avoided, and the route can be determined very closely to the destination point.

Figure 10:
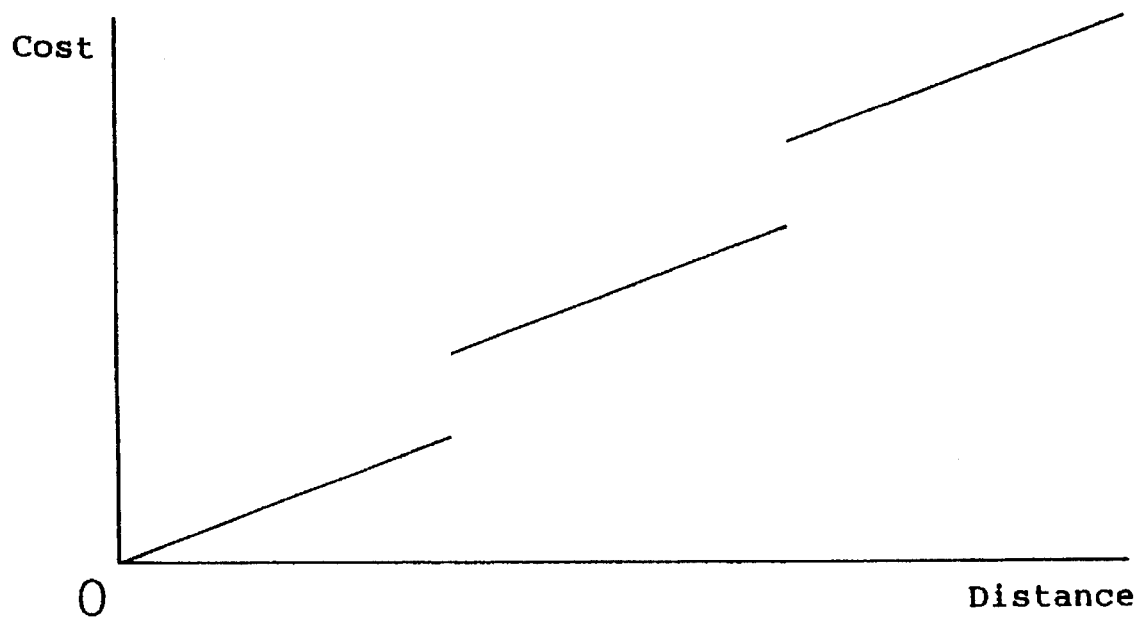
FIG. 10(a) is diagram showing an example of giving other initial cost than in the second and fourth embodiments of the invention (1).
FIG. 10(b) is diagram showing an example of giving other initial cost than in the second and fourth embodiments of the invention (2).
Figure 10:
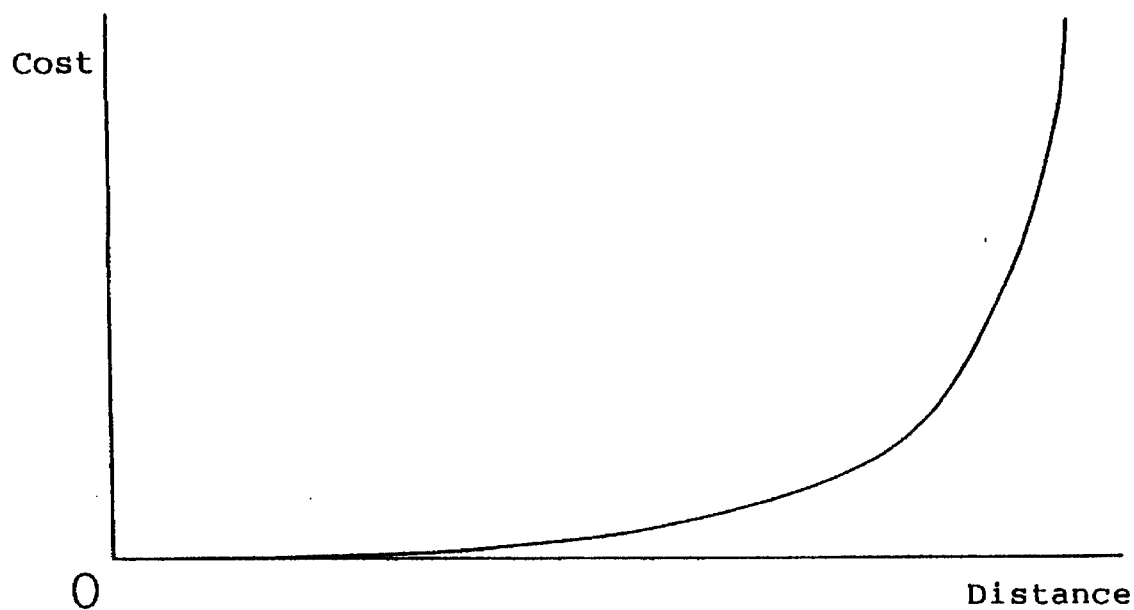

At step 906 in FIG. 9, the initial cost was given in proportion to the distance, but it is not always required to be proportional. FIG. 10 shows an example of giving other initial cost. It may be discontinuous as shown in FIG. 10(a), or the proportional coefficient m may be varied depending on the distance as shown in FIG. 10(b).

A third embodiment of the invention is described below. A block diagram of a recommended route guide apparatus showing the third embodiment of the invention is similar to that of the first embodiment.

Figure 11A:
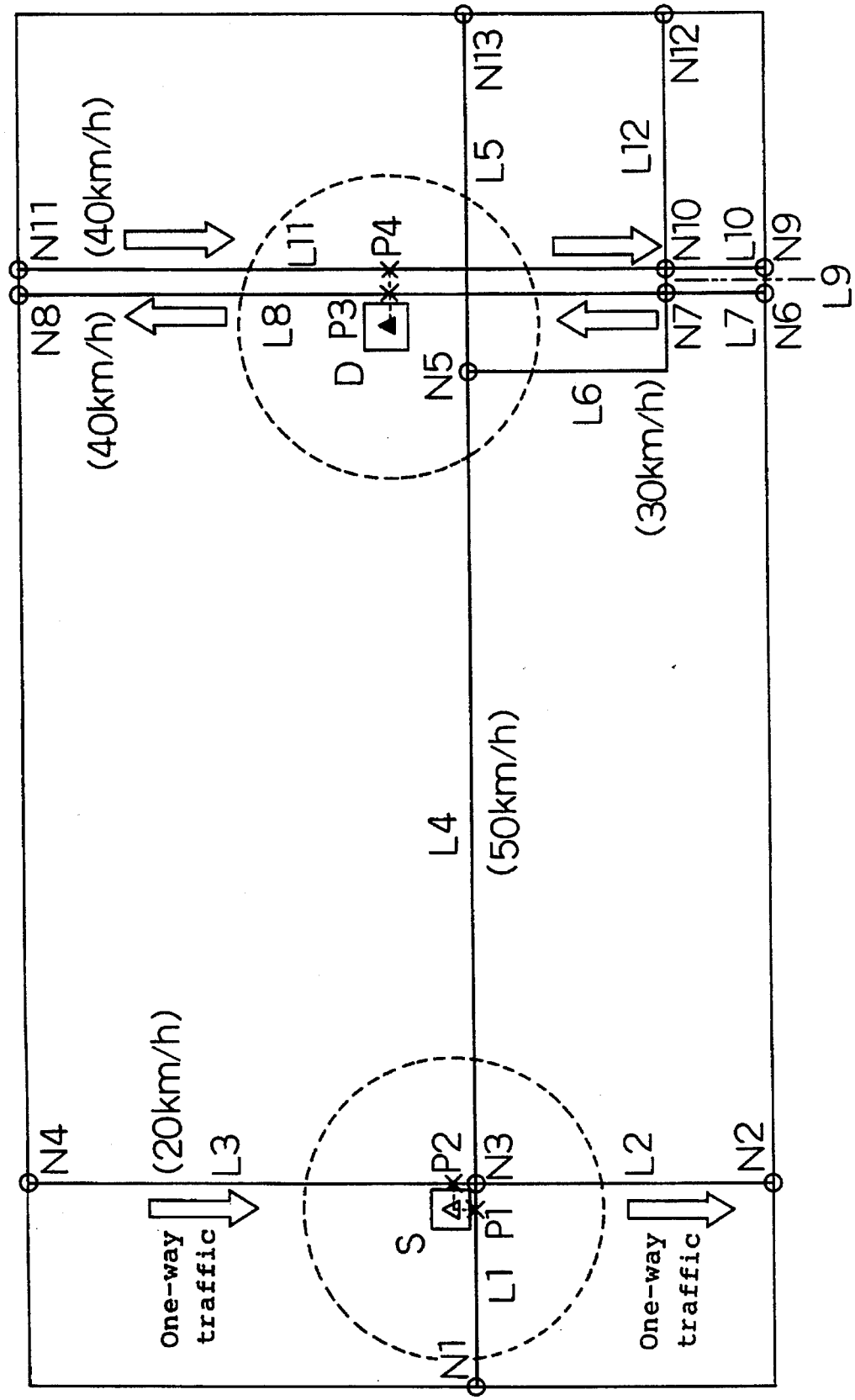
FIG. 11(a) is a diagram showing an example of road network in the third embodiment of the invention.
Figure 12A:
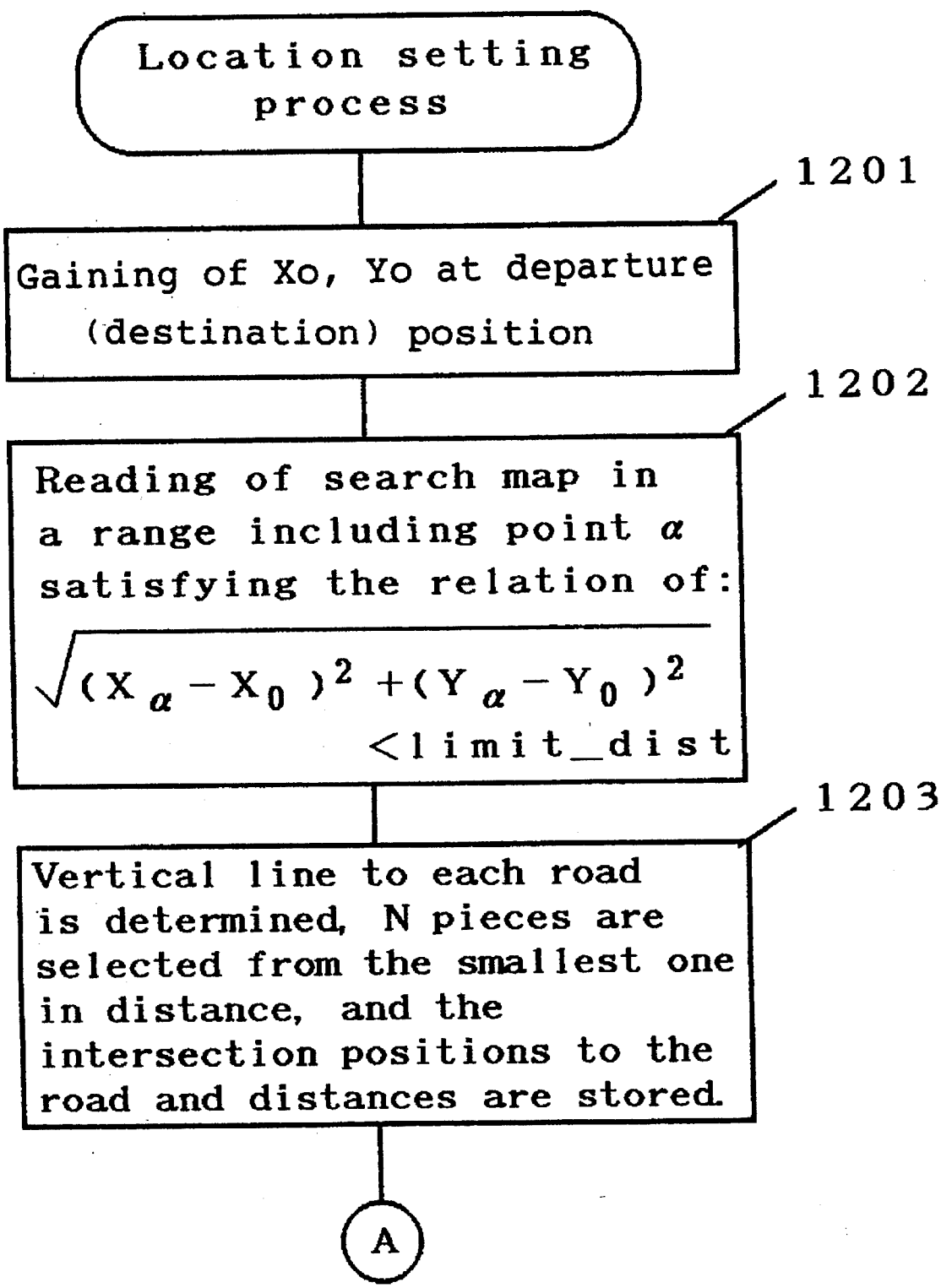
FIG. 12(a), (b) are a flow chart of location setting process in the third embodiment of the invention.

In the recommended route guide apparatus in the third embodiment, the operation is described below. FIG. 11(a) is a diagram showing an example of road network in the third embodiment, FIG. 11(b) is a diagram showing an example of node information in the road network, and FIG. 11(c) is a diagram showing an example of link information in the road network. FIG. 12(a), (b) are a flow chart of location setting process in the third embodiment of the invention.

Referring to the example of road network in FIG. 11 and flow chart of location setting process in FIG. 12(a), (b), the difference from the first embodiment is discussed. First, as shown in FIG. 11(a), in the road network represented by thirteen nodes N1 to N13 and twelve links L1 to L12, the node information as shown in FIG. 11(b) and the link information as shown in FIG. 11(c) are stored in the road network recording means 101. Herein, reference numerals are largely the same as in FIG. 2.

In such network, when the route is determined in a manner similar as in the first and second embodiments, only node N5 in FIG. 11(a) is selected as the search end point, and the finally selected route is a channel of node N3, link L4, and node N5. Accordingly, the route is selected only up to node N5, the route is known only up to considerably before reaching the destination point ▲. In the third embodiment, this problem is solved by changing the location setting process to the process as shown in FIG. 12(a), (b).

The difference between the location setting process in the third embodiment and the location setting process in the first and second embodiments lies in whether the setting standard of the search start point and search end point is placed on the link or on the node. In the first and second embodiments, the node close to the departure point or the destination point is selected as the search start point or search end point, but in the third embodiment, a link close from the position of departure point or destination point is selected, and the end node on that link is used as the search start point or search end point It is described in detail below referring to the flow chart in FIG. 12(a), (b). At step 1201 in FIG. 12(a), the user determines the position of departure point (destination point) by moving a cursor, which is shown on a map appearing on, for example, the CRT, and converts into a desired system of coordinates and obtains the position information. At step 1202, the map information in a range of circle with radius of limit_dist (dotted circle in FIG, 2: for example, a range of 50 m) is read in around the set coordinates of the departure point(destination point), but the range is limited to one map in this case for the sake of simplicity. At step 1203, the distance (the nearest distance to each differential data component) to each link (L1 to L12) is sequentially calculated from the longitude and latitude information in FIG. 11(b), link shape differential data in FIG. 11(c), and position information of departure point(destination point) obtained at step 1201, and N pieces (for example, two) are selected sequentially from the shortest distance, and the position and distance of the intersection of the-vertical line and link are recorded. In the case of FIG. 12(a), at the departure side, the position coordinates of point P1 on the link L1 and distance DP1, and the position coordinates of point P2 on the link L3 and distance DP2 are recorded, and at the destination side, the position coordinates of point P3 on the link L and distance DP3 8, and the position coordinates of point P4 on the link L11 and distance DP4 are recorded. At step 1204, it is judged whether it is the departure side or not. If judged to be the departure side, the process advances to step 1205, search start points are set at nodes N1, N3 that can be reached by one-way traffic rule from the point P1 on the selected link L1, and node N3 that can be reached by one-way traffic rule from point P2 on the selected link L3. The distance between the intersection P1 and node N1 is stored in the node N1, and the distance between the intersection P1 and the node N3 or the distance between the intersection P2 and the node N3, whichever the shorter, is recorded in the node N3. Further, at step 1206, a search start point flag is set up on the selected nodes N1, N3. On the other hand, when judged to be the destination side at step 1204, skipping to step 1208, search start points are set at the node N7 capable of advancing into the point P3 on the selected link L8 according to one-way traffic rule, and the node N11 capable of advancing into the point P4 on the selected link L11 according to one-way traffic rule. The distance, from the intersection P3 to the node N7 is recorded in the node N7, and the distance from the intersection P4 to the node N11 is recorded in the node N11. Further, at step 1209, a search endpoint flag is set up on the selected nodes N7, N11. Finally at step 1207, a specific value (for example, 0) is given as initial cost to the search start points (nodes N1, N3) and search end points (nodes N7, N11). This ends the location setting process.

Incidentally, there are four combinations of search start point and search end point, and in all combinations of routes, the total costs of these routes are compared in Table 3.

[TABLE 3.]

Examples of total costs of routes by combinations of routes in the third embodiment

| Search Start point | Search end point | Relay link | Route total cost |
| --- | --- | --- | --- |
| Node N1 | Node N7 | L1-L4-L6 | 309 (43 + 158 + 108) |
|  | Node N11 | No reaching route |  |
| Node N3 | Node N7 | L4-L6 | 266 (158 + 108) |
|  | Node N11 | No reaching route |  |

In this case, the minimum cost route is a route from node N3 to node N7, and the total cost is 266.

In this way, by processing route search in the same manner as in the first and second embodiments, by using the location setting technique which is a feature of the third embodiment, a channel of, node N3, link L4, link L6 and node N7 is determined as the minimum cost route. Accordingly, as in the case of, employing the location setting technique of the first and second embodiments, the phenomenon of determining the route up to the intersection on the road remote from the road near the destination point is avoided, and a proper route for reaching the destination point is determined.

Figure 12B:
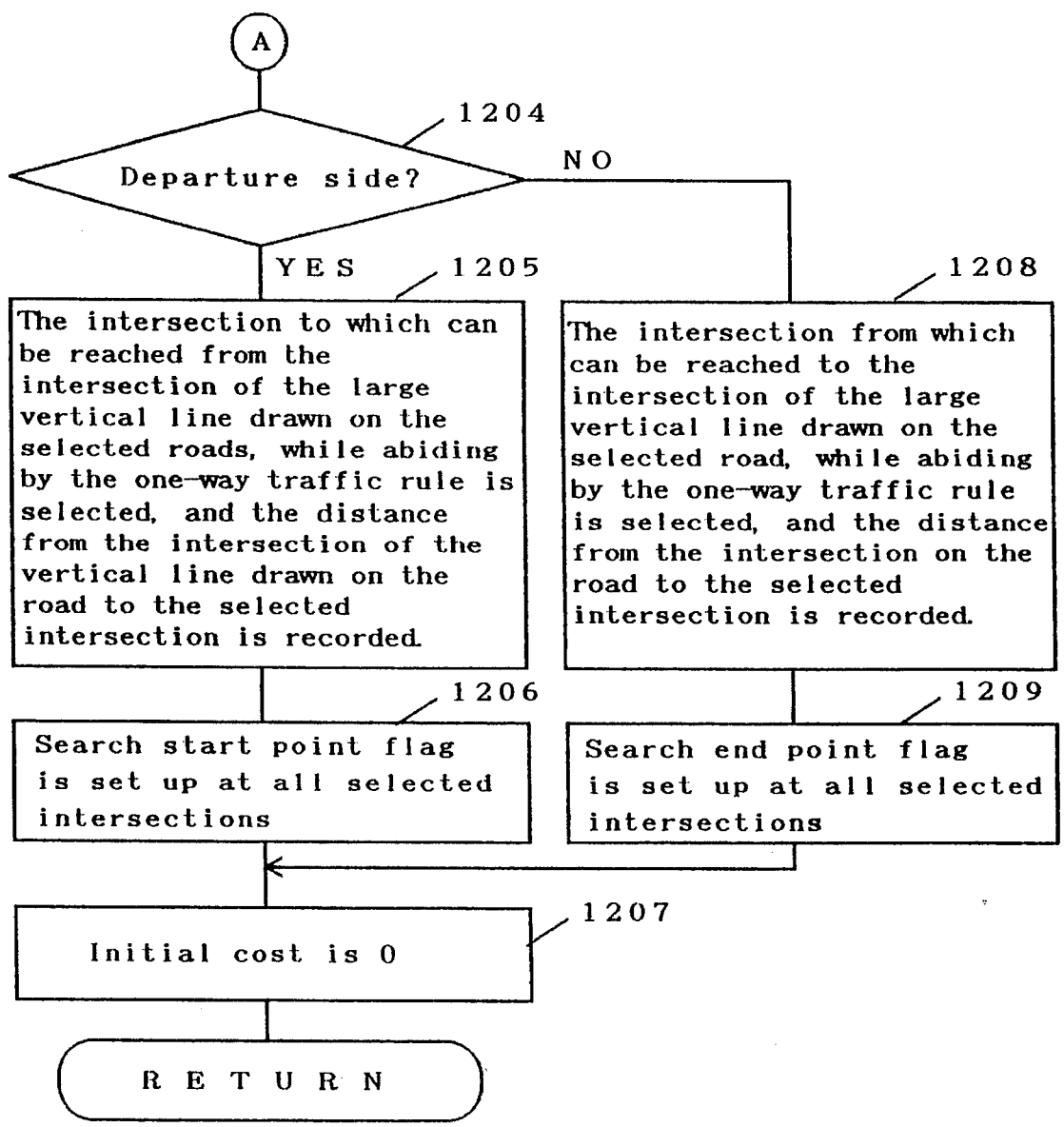

At step 1205 in FIG. 12(b), meanwhile, the distance from the intersection P1 to the node N3 or the distance from the intersection P2 to node N3, whichever the shorter, is recorded in the node N3, but the shorter one of the total distance from the departure point may be recorded, or the shorter one of the distance until coming out to the link may be also recorded. Moreover, by holding the shape data between the intersection with the vertical line preliminarily drawn onto the link from the departure point and the search start point and the shape data between the intersection with the vertical line drawn onto the link from the destination point and the search end point, route display or guidance to a middle of link may be effected. If vertical line cannot be drawn on the link shape, the point of the shortest distance to flex point of each shape data may be used as the intersection with the link.

A fourth embodiment of the invention is described below. A block diagram of a recommended route guide apparatus in the fourth embodiment of the invention is similar to the first embodiment.

Figure 13A:
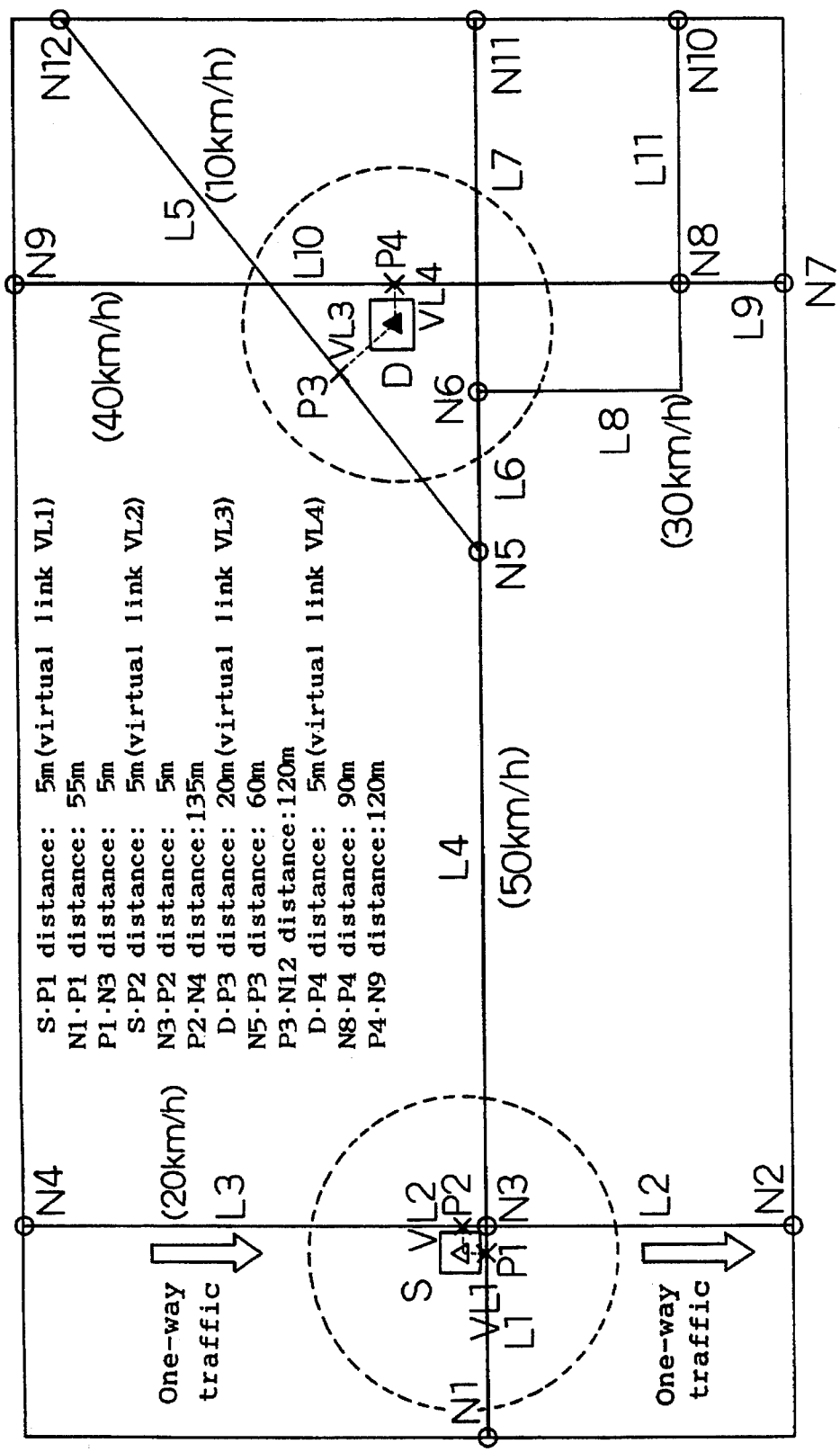
FIG. 13(a) is a diagram showing an example of road network in the fourth embodiment of the invention.
Figure 14A:
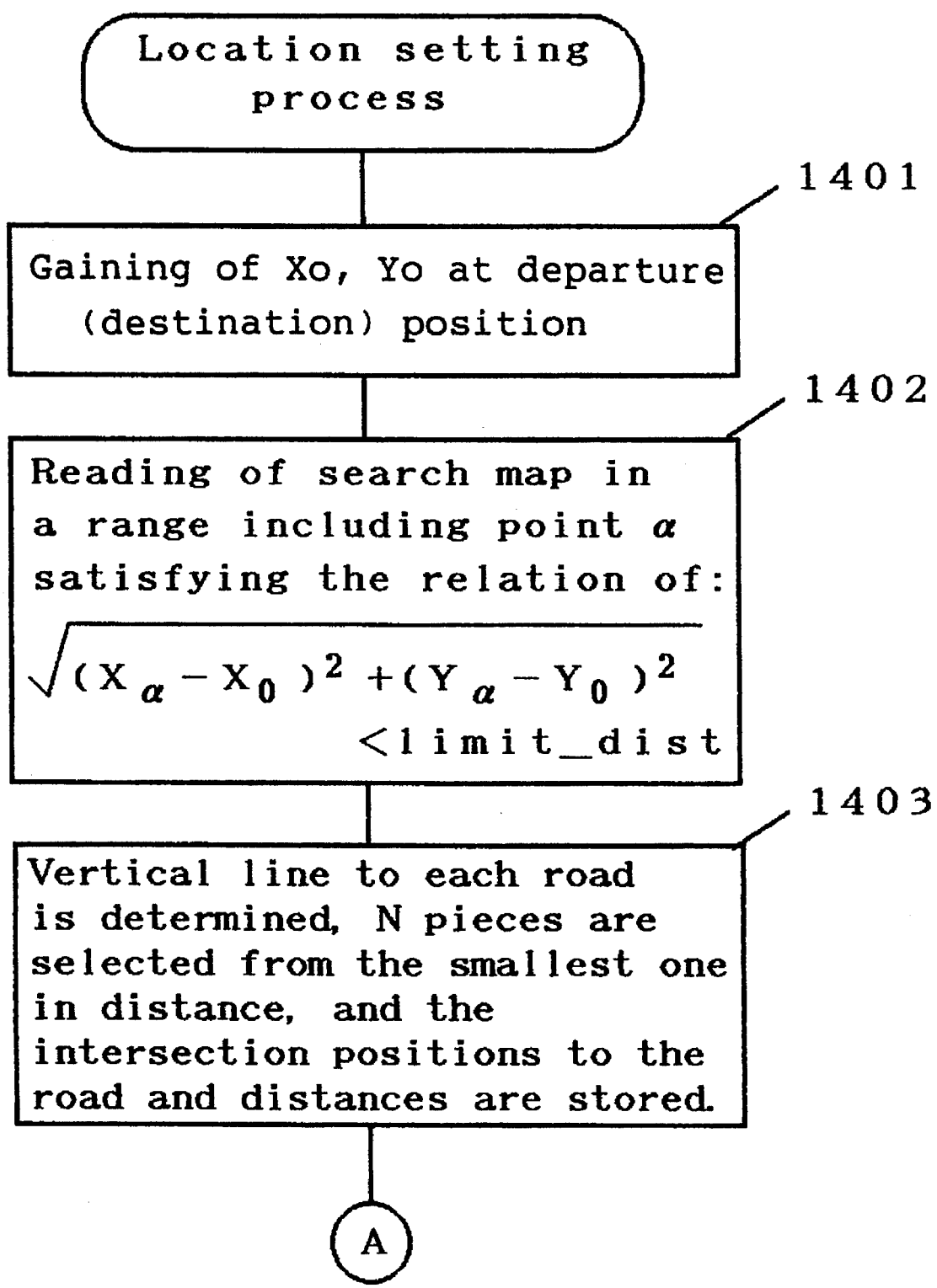
FIG. 14(a), (b) are a flow chart of location setting process in the fourth embodiment of the invention.

In the recommended route guide apparatus in the fourth embodiment, the operation is described below FIG. 13(a) is a diagram showing an example of road network in the fourth embodiment, FIG. 13(b) is a diagram showing an example of node information in the road network, and FIG. 13(c) is a diagram showing an example of link information in the road network. FIG. 14(a), (b) are a flow chart of location setting process in the fourth embodiment of the invention.

The difference from the third embodiment is described below by referring to the road network in FIG. 13 and flow chart of location setting process in FIG. 14(a), (b). First, as shown in FIG. 13(a), in the road network represented by twelve nodes N1 to N12 and eleven links L1 to L11, the node information as shown in FIG. 13(b) and link information as shown in FIG. 13(c) are stored in the road network recording means 101. Herein, reference numerals are similar to those in FIG. 2.

In such network, if the route is determined same as in the first and second embodiments, the node N3 is selected as search start point and node N6 is selected as search end point, and therefore the route to be selected finally is the route connecting the node N3 and node N6, that is, node N3, link L4, link L6 and node N6. Therefore, the route is determined only up to node N6, and the route is known only up to considerably before reaching the destination point ▲. Or, when the route is determined as in the third embodiment, the node N3 is selected as the search start point and the nodes N5, N8, N9, N12 is selected as search ends points, and therefore the finally selected route is the minimum cost route connecting the search start point group (node N3) and search end point group (nodes N5, N8, N9, N12), that is, node N3, link L4 and node N5. Accordingly, only the route passing through the node N5 and reaching the point P3 is determined, and proper route to reach the destination point ▲ is not determined. Hence, in the fourth embodiment, the problem is solved by changing the location setting process to the process shown in FIG. 14(a), (b).

The difference between the location setting process in the fourth embodiment and the location setting process in the third embodiment lies in the setting of initial cost at step 1407. In the third embodiment, the value was uniform (0) as shown in step 1207, but in the fourth embodiment, as shown in step 1407, the initial cost is given by the sum of the cost proportional to the distance of the vertical line drawn on the link and the cost for traveling on the link. Herein, the proportional coefficient m1, m2 at step 1407 are positive real, numbers. Supposing the vertical line drawn from the departure point S on link L1 to be virtual link VL1 (intersection with link L1 to be P1), the vertical line drawn on line L3 to be virtual link VL2 (intersection with link L3 to be P2), and the vertical line drawn from the destination point D on link L5 to be virtual link VL3 (intersection with link L5 to be P3), and the vertical line drawn on link. L10 to be virtual link VL4 (intersection with link L10 to be P4), each virtual link is assigned with a virtual link costs equivalent to the initial cost, and therefore the same effects as when the minimum cost route is determined on the road network including the virtual links from the departure point S to the destination point D are obtained without processing the map data.

For example, among the links in FIG. 13(a), the smallest average travel speed is 10 km/h, but as a virtual link cost, a value equal to travel at speed of 5 km/h on virtual link is given. As the cost of advancing to next intersection from the point of reaching an ordinary link from a virtual link, a value distributing the entire cost of an ordinary link by the ratio of traveling distance is given. Hence, the following initial cost is given at node N3.

[1]  5 (m)/5 (km/h) × 36 +                virtual link cost
     43 (cost of link L1)/60 (m) ×        distributed cost
     5 (m) =                              on link L1
     40 (10⁻¹ sec)                        [initial cost via link L1]
[2]  5 (m)/5 (km/h) × 36 +                virtual link cost
     252 (cost of link L3)/140 (m) ×      distributed cost
     5 (m) =                              on link L3
     45 (10⁻¹ sec)                        [initial cost via link L3]

The initial cost via link L1 is smaller than that via link L3, and the information via link L1 is left over at node N3. Hence, the initial cost is 40.

Similarly, at both search start point and search end point, the initial cost is as shown in Table 4.

[TABLE 4.]

Examples of initial cost at search start point and search end point in the fourth embodiment

| Classification | Node number | Initial cost |
| --- | --- | --- |
| Search start point | Node N1 | 75 |
|  | Node N3 | 40 |
| Search end point | Node N5 | 360 |
|  | Node N8 | 117 |
|  | Node N9 | 144 |
|  | Node N12 | 576 |

There are eight combinations of search start point and search end point in total. Table 5 compares total costs of these routes in all combinations of route at the initial cost mentioned above.

[TABLE 5.]

Examples of total costs of routes in combinations of routes in the fourth embodiment

| Search start point | Search end point | Relay link | Route total cost |
| --- | --- | --- | --- |
| Node N1 | Node N5 | L1-L4 | 609 (75 + 43 + 130 + 360) |
|  | Node N8 | L1-L4-L6-L8 | 514 (75 + 43 + 130 + 29 + 120 + 117) |
|  | Node N9 | L1-L4-L6-L8-L10 | 730 (75 + 43 + 130 + 29 + 120 + 189 + 144) |
|  | Node N12 | L1-L4-L8 | 1472 (75 + 43 + 130 + 648 + 576) |
| Node N3 | Node N5 | L4 | 530 (40 + 130 + 360) |
|  | Node N8 | L4-L6-L8 | 436 (40 + 130 + 29 + 120 + 117) |
|  | Mode N9 | L4-L6-L8-L10 | 652 (40 + 130 + 29 + 120 + 189 + 144) |
|  | Node N12 | L4-L5 | 1394 (40 + 130 + 648 + 576) |

In this case, the minimum cost route is a route from node N3 to node N8, and the total cost is 436.

Thus, by processing the route search same as in the first embodiment by employing the location setting technique which is a feature of the fourth embodiment, the shortest cost route linking the search start point and search end point is determined in the channel of node N3, link L4, link L6, link L8 and node N8. Hence, unlike the location setting techniques in the first, second and third embodiments, it is free from the phenomenon of selecting an improper route to reach the destination point, so that an appropriate route to the destination point can be determined.

Figure 14:
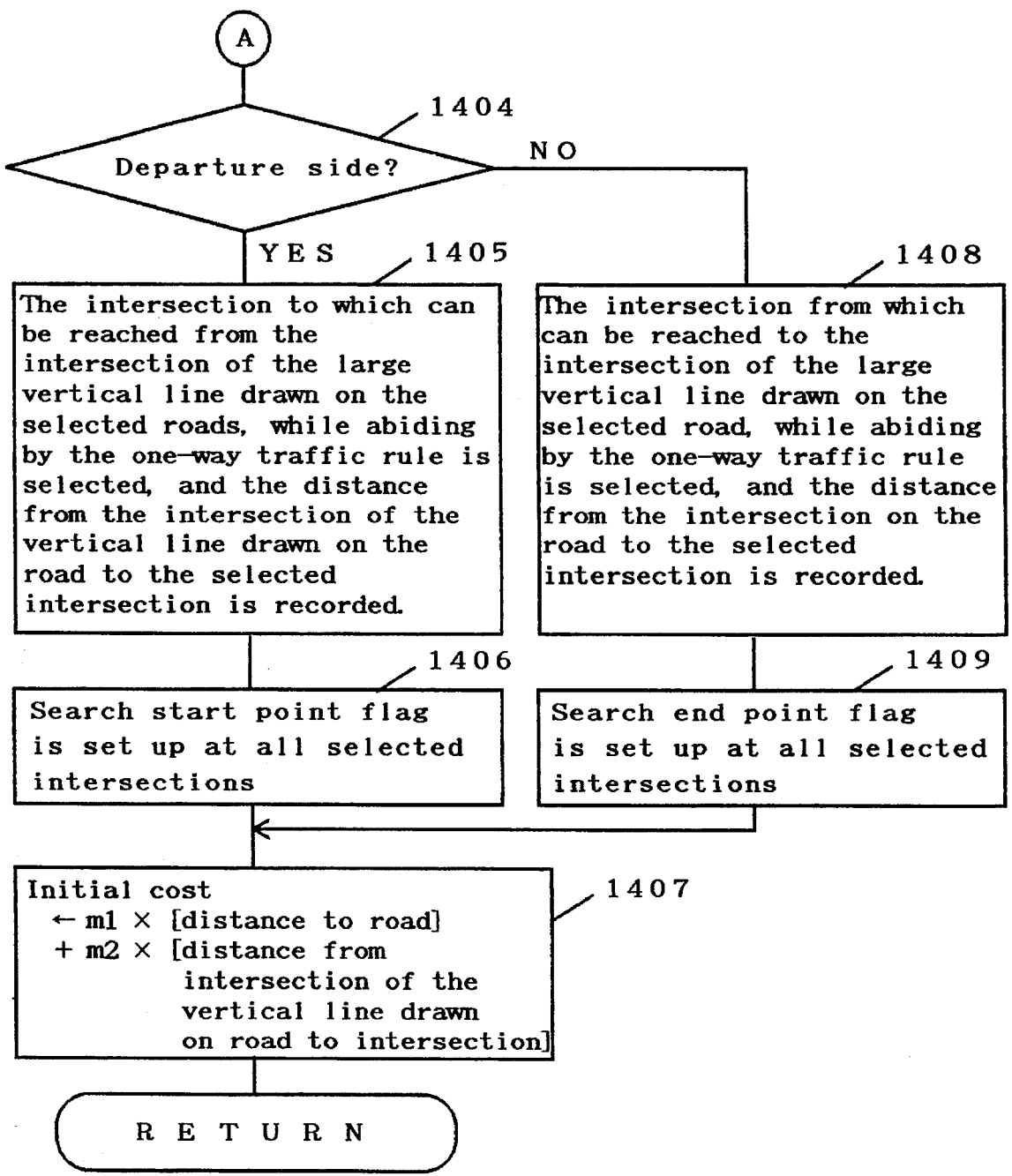
Figure 15B:
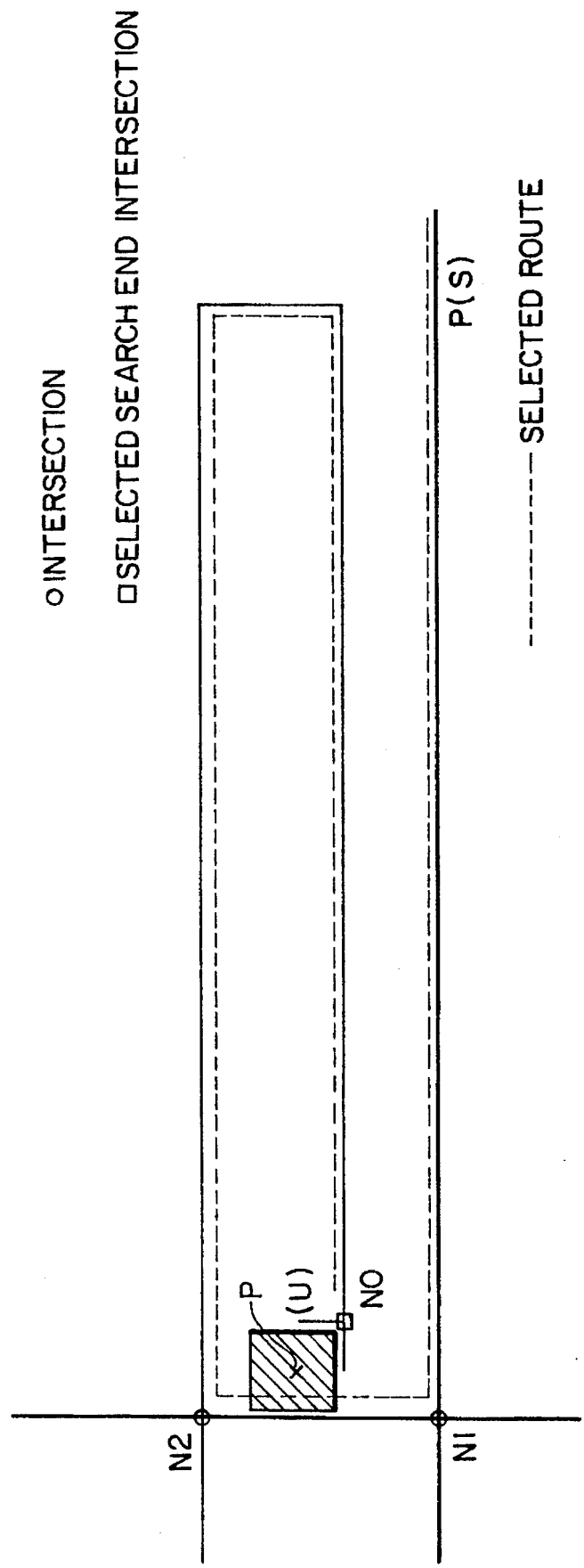
FIG. 15(b) is a diagram showing an example of selected route determined by the conventional location setting method.

At step 1407 in FIG. 14(*b*), a virtual link cost is given in proportion to the distance to the link, but it may be also discontinuous as shown in FIG. 10(*a*), or the proportional coefficient m may be varied depending on the distance as shown in FIG. 10(*b*). Besides, as the cost from the intersection with the vertical line on the link to the link end node, the cost of the entire link was distributed by distance, but a link cost may be given newly by assuming a specific virtual travel speed. Otherwise, an initial cost may be given in proportion to the linear distance to the node. In this case, moreover, it may be discontinuous as shown in FIG. 10(*a*) with respect to the linear distance to the node, or the proportional coefficent may be varied depending on the linear distance as shown in FIG. 10(*b*). The configuration on the basis of the link having a vertical line drawn from the destination point, that is, the penalty cost of right or left turn determined depending on turning whether to left or to right when going from that link to the destination point by traveling on the route may be added to the initial cost at the destination side.

Commonly in the first to fourth embodiments, the departure side search start point may be set by determining the present position and direction of the vehicle. For example, if the vehicle is not present on the link, the departure side search start point may be set according to the embodiment on the basis of the obtained position information, or if the vehicle is present on the link, the end node of the link in the forward direction of the vehicle may be set in the departure side search start point. The search start point may be assigned with an initial cost corresponding to the link travel portion When the vehicle is present on the link, if possible to advance in the opposite direction of the forward direction of the vehicle according to the one-way traffic rule, the opposite end node of the link may be added to the search start point at the departure side. In this case, the sum of the link cost equivalent to the link traveling portion and the U-turn penalty cost may be added as initial cost. When the present position does not exist on the link, the penalty cost may be added to the initial cost depending on the angle formed by the vehicle direction and the link.

Finally, the cost may be added depending on the turning angle at intersection or leaving the street when searching, or the evaluation standard of search (object of cost) may include the concept of fee or ease of travel. The method of search was two-way search for searching from both departure side and destination side, but it may be also one-way search of searching from either departure side or destination side. In such a case, the initial cost at the search end point is added as an extra cost to the reaching cost when the point becomes a search candidate state. As a result, the route of minimizing the total cost including the extra cost is selected. In the case of one-way search, moreover, the destination side may be set at the search start point, and the searching range may be extended toward the departure side. In the searching method, moreover, a hierarchically structured map may be used for searching, and not limited to the Dijkstra method, any method capable of determining the minimum cost route may be employed. The output means, not merely displaying the route, may guide by voice just before the intersection to turn by gaining the present position of the vehicle. The location setting method may not be necessarily the same at departure side and destination side.

Thus, by the first means of the invention, by setting the search start point and search end point at plural intersections near the position for setting the location, passing over or other inappropriate route selection can be prevented without requiring new input task.

According to the second means, by giving the initial cost by the function of the distance from the position having the location set at plural intersections selected by the first means, it is effective to prevent from setting an intersection remote from the location setting position as start point or end point of route.

According to the third means, by setting the intersections capable of passing while abiding by the traffic regulations among the intersections at both ends on one or more roads near the location setting position as the search start point or search end point, it is effective to prevent from setting the intersection not connected to the road near the location setting position as start point or end point of route.

Finally, according to the fourth means, by providing the plural intersections selected by the third means with the initial cost by the sum of the cost given by the function of the distance to the road near the location setting position and the cost given by the function of the traveling distance on the nearby road, a most appropriate road to reach the destination point from the departure point can be selected.

What is claimed is:

1. A recommended route guide apparatus comprising, road network recording means for recording positions and connection relations of intersections and roads, location setting means for setting a departure point and a destination point, search start and end point setting means for selecting a plurality of search start points and search end points within using a specific range on a map on the basis of the departure point and destination point set by the location setting means, search means for determining a recommended route by investigating each link connecting the search start points and search end points set by the search start and end point setting means in accordance with information in the road network recording means and according to specific traffic rules, and output means for outputting a route obtained by the search means.

2. A recommended route guide apparatus of claim 1, wherein the search start points and the search end points are intersections on the map, and the search start and end point setting means charges an initial cost upon starting a search or an additional cost corresponding to the search end point according to a function relating to a distance between each selected intersection point and the departure point or the destination point.

3. A recommended route guide apparatus of claim 1, wherein the search start points and the search end points are intersections on the map, and the search start and end point setting means selects at least one adjacent road link from position information corresponding to the departure point and destination point respectively, and intersections at both ends of the road link.

4. A recommended route guide apparatus of claim 3, wherein the search start and end point setting means selects only intersections that can be reached by abiding by traffic rules, from the intersections corresponding to ends of the road links.

5. A recommended route guide apparatus of claim 1, wherein the search start points and the search end points are intersections on the map, and the search start and end point setting means determines a nearest point on a road link proximal to the departure point or destination point, and determines a distance to the nearest point, and charges an initial cost upon starting the search or an additional cost corresponding to the search end point according to a function of said distance.

6. A recommended route guide apparatus of claim 4, wherein the search start and end point setting means determines a nearest point on a road link proximal to the departure point or destination point, and charges an initial cost upon starting the search or an additional cost corresponding to the search end point according to a function of a distance between the nearest point and intersections at both ends of the road link.

7. A recommended route guide apparatus of claim 4, wherein the search start and end point setting means determines the nearest point on each road link proximal to the departure point or destination point, and a distance between the nearest point and the departure or destination point, and charges an initial cost upon starting a search or an additional cost corresponding to the search end point by a sum of a cost given by a function of the nearest point distance and a cost given by the function of the distance from the nearest point to intersections at both ends of the road link.

8. A recommended route guide apparatus of claim 4, wherein the search start and end point setting means charges an initial cost upon starting a search or an additional cost corresponding to the search end point according to a function of a distance from the departure point or destination point to each search start point and search end point.

9. A recommended route guide apparatus of claim 4, wherein the search start and end point setting means determines the search start point of a departure side or the search end point of a destination side based on a position and a direction of a vehicle.

10. A recommended route guide apparatus of claim 4, wherein the search start and end point setting means adds a penalty cost to an initial cost depending on an angle formed by a direction of a vehicle and a road link upon starting a search at departure side or adding an additional cost corresponding to the search end point at the destination side.

11. A recommended route guide apparatus of claim 4, wherein the search start and end point setting means adds a penalty cost to an initial cost associated with right or left turns according to a positional relation of the destination point and road link upon starting a search at destination side or adding an additional cost upon reaching the search end point at the departure side.

* * * * *